(12) United States Patent
Gandhi et al.

(10) Patent No.: US 8,577,724 B1
(45) Date of Patent: Nov. 5, 2013

(54) SERVING REQUESTS BY SELECTIVELY USING A PLURALITY OF RESPONSE PROVIDERS

(75) Inventors: Devkumar R. Gandhi, Fremont, CA (US); Jayash G. Kumar, Fremont, CA (US); Liangen Leon Zhang, San Ramon, CA (US)

(73) Assignee: Nexage Inc., Fremont, CA (US)

( * ) Notice: Subject to any disclaimer, the term of this patent is extended or adjusted under 35 U.S.C. 154(b) by 1093 days.

(21) Appl. No.: 12/098,362

(22) Filed: Apr. 4, 2008

(51) Int. Cl.
*G06Q 30/00* (2012.01)
(52) U.S. Cl.
USPC .......... 705/14.49; 705/14.66; 705/14.67
(58) Field of Classification Search
USPC .......... 705/14.4, 14.49, 14.66, 14.67
See application file for complete search history.

(56) References Cited

U.S. PATENT DOCUMENTS

| | | | |
|---|---|---|---|
| 2006/0242017 A1* | 10/2006 | Libes et al. | 705/14 |
| 2007/0192185 A1* | 8/2007 | Yassa | 705/14 |
| 2008/0249853 A1* | 10/2008 | Dekel et al. | 705/14 |
| 2009/0287569 A1* | 11/2009 | Shuster et al. | 705/14.53 |
| 2009/0299857 A1* | 12/2009 | Brubaker | 705/14.66 |
| 2009/0307093 A1* | 12/2009 | Bertoni et al. | 705/14.66 |

* cited by examiner

*Primary Examiner* — Lindsay M. Maguire
(74) *Attorney, Agent, or Firm* — Barlow, Josephs & Holmes, Ltd.

(57) ABSTRACT

A multi-provider response selector (MPRS) receives requests and provides respective selected responses. Each request includes respective selection criteria (such as keywords and demographic/geographic information) and/or respective other information (such as page location/time and demographic/geographic information). The MPRS uses the respective selection criteria to fill each of the requests (obtaining the respective selected responses) from one of a plurality of response providers, where the response providers are optionally selected in an order determined by the respective other information and/or other factors such as value returned from the response providers. Optionally, a content server receives content requests for respective specified content, generates requests for the MPRS, and returns the specified contents along with respective selected responses. In one example, a content request is from a cellular telephone, respective specified content includes video content, and respective selected responses include advertisements.

25 Claims, 5 Drawing Sheets

SERVING REQUESTS BY SELECTIVELY USING A PLURALITY OF RESPONSE PROVIDERS

BACKGROUND

1. Field

Advancements in serving requests are needed to provide improvements in one or more of performance, revenue, scalability, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Some web sites, for example some search engines, have a relationship with a response provider where the web site places content provided by the response provider on formatted pages (such as web pages or Wireless Application Protocol pages) that are presented for display. The web site sends a request to the response provider for content. The request includes a list of one or more keywords related to a page to be displayed, and the response provider attempts to provide suitable content matching the keywords. In some cases, the fill rate (the success rate in finding the suitable content) of the response provider is low.

Some content service providers provide hosting for content provided by a client (a content source), enabling the content to be accessible over a network, such as the Internet. For example, the content service provider operates a content server to host the client content, to receive requests (such as in a form of Uniform Resource Locators or URLs) for specific portions of the client content, and to transmit the specific portions of the client content in response to the requests. For the client to participate in revenue for the client content, the client arranges for a response provider to provide suitable additional content to be used with the client content. The client must develop and maintain a business relationship with the response provider, and the revenue is determined in part by the fill rate of the response provider.

Some response providers share revenue with the client based on response statistics. For example, for some response providers that are advertisement (ad) providers, revenue sharing is based on ad statistics. The fill rate (also called the serve-through rate) is the percentage of ad requests that are satisfied (filled) by the ad provider. The click-through rate (CTR) is the percentage of delivered ads that are clicked on by a user. Ad revenue and/or ad cost is sometimes measured and/or accrued in cost per mille (thousand) impressions (CPM), which measures revenue and/or cost per thousand delivered ads, or in cost per click (CPC), which measures revenue and/or cost per clicked-through ad. Effective CPM (eCPM) is a measured and/or calculated CPM used, for example, when ad revenue and/or cost are determined on another basis (such as CPC).

SYNOPSIS

The invention may be implemented in numerous ways, including as a process, an article of manufacture, an apparatus, a system, and as a set of computer-readable descriptions and/or instructions embedded on and/or in a computer-readable medium such as a computer-readable storage medium or a computer network wherein computer-executable instructions are sent over optical or electronic communications links. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The Detailed Description includes an Introduction to facilitate the more rapid understanding of the remainder of the Detailed Description. The Introduction includes Example Combinations of one or more of systems, methods, articles of manufacture, and computer-readable media in accordance with the concepts described herein. As is discussed in more detail in the Conclusions, the invention encompasses all possible modifications and variations within the scope of the issued claims.

DETAILED DESCRIPTION

Figure 1A:
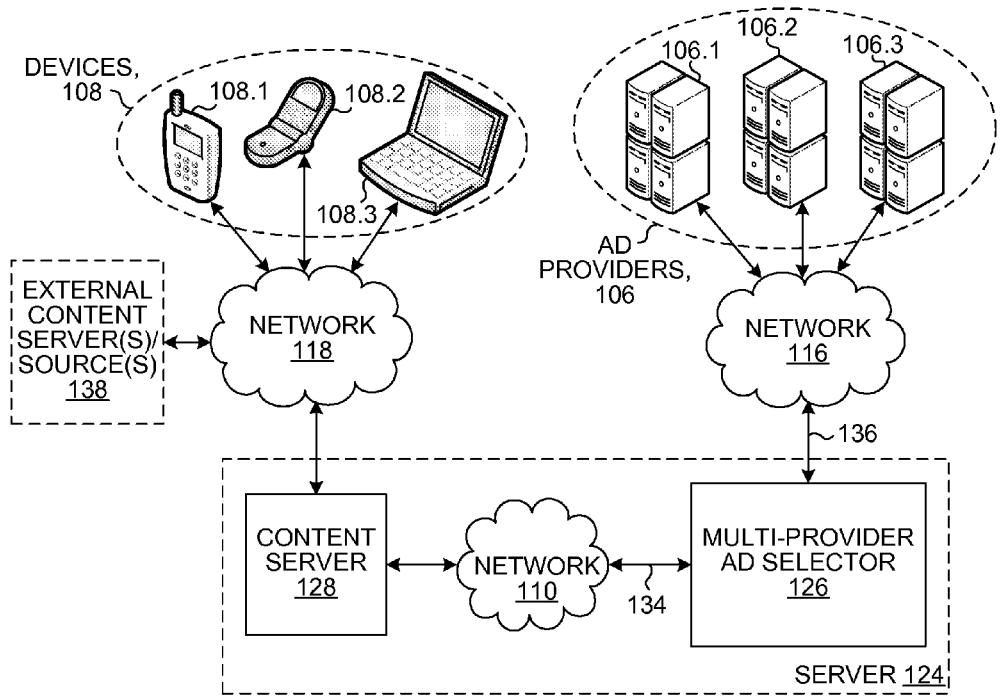
FIG. 1A illustrates selected details of an embodiment of a system including a multi-provider ad selector.

A detailed description of one or more embodiments of the invention is provided below along with accompanying figures illustrating selected details of the invention. The invention is described in connection with the embodiments. It is well established that it is neither necessary nor practical to exhaustively describe every embodiment of the invention. Thus the embodiments herein are understood to be merely exemplary, the invention is expressly not limited to or by any or all of the embodiments herein, and the invention encompasses numerous alternatives, modifications and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or computer-executable instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms and Terms

Elsewhere herein various shorthand abbreviations, or acronyms, are used to refer to certain elements. The descriptions of at least some of the acronyms follow.

| Acronym | Description |
| --- | --- |
| CPC | Cost Per Click |
| CPM | Cost Per Mille (thousand) impressions |
| CTR | Click-Through Rate |
| eCPM | Effective CPM |
| EDGE | Enhanced Data for GSM Environment |
| EvDO | Evolution Data Optimized |
| GPRS | General Packet Radio Service |
| HSDPA | High-Speed Downlink Packet Access |
| HSUPA | High-Speed Uplink Packet Access |
| HTML | HyperText Markup Language |
| ISP | Internet Service Provider |
| MPAS | Multi-Provider Ad Selector |
| MPRS | Multi-Provider Response Selector |
| PC | Personal Computer |
| PDA | Personal Digital Assistant |
| SP | Service Provider |
| STR | Serve-Through Rate |
| UMTS | Universal Mobile Telecommunication System |
| UMTS LTE | UMTS Long Term Evolution |
| URL | Uniform (Universal) Resource Locator |
| WAP | Wireless Application Protocol |
| WiMAX | Worldwide Interoperability for Microwave Access |
| WML | WAP Markup Language |

The term computer as used herein refers to any type of processor, CPU, microprocessor, microcontroller, embedded processor, media processor, graphics processor, or any other programmable device capable of executing (including interpreting) instructions in a form of software (such as microcode, firmware and/or programs). A computer system is a system that contains a computer, and a server is a type of computer system.

The term software as used herein refers to any type or combination of types of computer-executable instructions for any one or more types of computers, such as programs, applications, scripts, drivers, operating systems, firmware, and microcode. Computer-executable instructions include any types of instructions performed by a computer, such as binary instructions that are directly performed, instructions that are translated and/or decoded prior to being performed, and instructions that are interpreted.

Overview

An MPRS receives requests and provides respective selected responses. Each request includes respective selection criteria (such as keywords and demographic/geographic information) and/or respective other information (such as page location/time and demographic/geographic information). The MPRS uses the respective selection criteria to fill each of the requests (obtaining the respective selected responses) from one of a plurality of response providers, where the response providers are optionally selected in an order determined by the respective other information and/or other factors such as value returned from the response providers. Optionally, a content server receives content requests for respective specified content, generates requests for the MPRS, and returns the specified contents along with respective selected responses. In one example, a content request is from a cellular telephone, respective specified content includes video content, and respective selected responses include advertisements.

The requests are optionally and/or selectively requests for ads, an MPRS functions as an MPAS, the response providers are ad providers, and the responses include ads. The value returned is optionally in a form of one or more of: money, revenue, remuneration, recompense, remittent, earnings, gain(s), proceeds, profit, yield, compensation, and disbursement, according to usage scenario and embodiment.

In some situations, receiving requests and providing responses (including processing to determine the responses) is constrained to occur within an acceptable latency. For example, when a user of a cellular phone taps an icon to view a movie trailer, then a request/response related to a pre-roll ad (to be displayed to the user before the movie trailer) is more useful if completed within a latency that is less than a latency of delivery of the movie trailer. For another example, when a user of a PDA selects a next e-mail message to be displayed, then a request/response related to a banner ad (to be displayed with the next e-mail message) is more useful if completed with a latency similar to a latency of the display of the next e-mail message.

This Overview section concludes with an overview of one set of embodiments. Details of some other embodiments are described in subsequent sections.

In some embodiments, a content service provider operates a content server (such as content server 128 as illustrated in FIG. 1A), the content server storing content and returning selected portions of the content in response to requests from respective requesters (such as from one or more of devices 108 as illustrated in FIG. 1A). The content server is a computer and/or a computer system (such as a server, a mainframe, a cluster, or a distributed cluster). In various embodiments, the content server is distributed across multiple sites so that each of the requests to the content server is answerable by one of the sites close or closest to the respective requester.

According to various embodiments, one or more of: the content is provided to the content service provider as original content by one or more content sources or other content servers (such as external content server(s)/source(s) 138 as illustrated in FIG. 1A); the content is stored on the content server in a same format in which the content is provided; the content is stored on the content server in at least one format other than a format in which the content is provided; a contest request is processed by the content server, at least in part, by retrieving a selected portion of the stored content; and a contest request is processed by the content server, at least in part, by forwarding the request to an external content server/ source (such as external content server(s)/source(s) 138 as illustrated in FIG. 1A). For example, one of the content sources is a media company, such as a broadcast television network, or an advertising company. The original content is stored directly on the content server, and/or the content service provider process and/or transforms the original content to produce the content stored on the content server. Continuing the example, the original content is in a high-definition video format, and the content service provider transforms the original content into one or more other video formats to produce the content stored on the content server. In various embodiments and/or usage scenarios, storing the content on the content server in a plurality of formats enables more rapid response to the requests for the selected portions of the content.

In some embodiments, the content server does not store all possible content of an external content server/source, and at least some of the requests to the content server from a device are forwarded to one or more external content servers/sources (such as external content server(s)/source(s) 138 as illustrated in FIG. 1A). Responses from the external content servers/sources are optionally embedded in a formatted display for eventual presentation on one or more visual and/or audio output elements of the device, such as by including the responses as part of web pages or Wireless Application Protocol (WAP) pages, and are forwarded to the respective requesters. In various embodiments and/or usage scenarios, at least some of the forwarded requests are requests for video content, and at least some of the responses from the external content servers/sources include video content and/or video streams. In further embodiments, at least some of the video content and/or video streams are transformed (such as by being processed and/or reformatted) by the content server, for example by changing a type of video format, as part of forwarding the response to the respective requesters.

In some embodiments, at least some of the content stored on the content server is transformed (such as by being processed and/or reformatted) on the fly in response to the request. In a first example, the request is originated from a device requiring a video format that is not already stored as a version of the selected portion of the content. Another version of the selected portion of the content (in a different video format, such as a high-resolution video format) is retrieved and transformed on the fly to produce at least part of a response to the request. In a second example, an external content server/source hosts a large number of user-provided videos, with a low average access rate per video. Rather than host all of the user-provided videos on the content server, the content server retrieves at least some of the user-provided videos on demand by forwarding a request for one of the user-provided videos to the external content server/source. The forwarded request returns a result, such as a video stream, to the content server. According to various embodiments, the result is one or more of: used directly as at least part of a response to the request; transformed on the fly, such as by changing a video format on the fly, to produce a version used as at least part of a response to the request; and stored, optionally and/or selectively in an as-provided version and/or in one or more transformed versions, where one of the stored versions is used as at least part of a response to the request.

In some embodiments, a request for content stored on the content server is in a form of a request for a portion of the original content of a particular one of the content sources, and the request is satisfied by returning a transformed version of the portion of the original content. For example, the transformed version is created and/or is selected for compatibility with a native browser and/or with other features or limitations of a device sourcing the request. According to various embodiments, the transformed version of the portion of the original content is one or more of: stored on the content server; produced on-the-fly from a stored copy of the portion of the original content; and produced on-the-fly from a stored version of the portion of the original content. In further embodiments, the transforming is according to a type and/or a model of a device sourcing the request, and/or to other information associated with the request. For example, a request originates at a particular cellular telephone, and the response to the request is selected for display on the particular cellular telephone, such as by selecting a particular one of a plurality of video formats for a video portion of the response. In various embodiments, hiding details of formatting necessary for display on sourcing devices, such as cellular telephones, provides users with a perception of uniform access to the content, independent of the sourcing devices.

In some embodiments and/or usage scenarios, the content server is accessible via a network, such as the Internet, and responds to one or more network locators. For example, a same content server serves content of a first content source when accessed via a URL m.customer1.com, and serves content of a second content source when accessed via a URL m.customer2.com. Accordingly, in various embodiments, the content served by the content server in response to a request is determined, at least in part, by a network locator (such as a URL) via which the content server is accessed by the request. As used herein, network locator refers to any technique for accessing content on a network and includes, for example, network addresses, URLs, and other network device and/or resource and/or content identifiers.

Requests from respective requesters (such as from devices 108 as illustrated in FIG. 1A) for selected portions of the content are received by the content server, processed, and (assuming the requests are satisfiable, such as when the selected content is available) the selected portions of the content are returned to the respective requesters. According to various embodiments, the requests are sourced (initially transmitted) from one or more of: mobile devices, such as cellular telephones; wireless devices, such as Personal Digital Assistants (PDAs), music players, or electronic books; Personal Computers (PCs); workstations; servers; and any other device and/or computer configured to transmit requests to the content server via a network.

In various embodiments, the selected portions of the content are returned as part of respective formatted displays, such as web pages or WAP pages. In some embodiments and/or usage scenarios, the formatted displays each include locations and/or times and/or types (or preferred types) for one or more advertisements (ads). According to various embodiments, the ads are one or more of: still ads; animated ads; games; video ads; any other type of ad; and any combination of the foregoing. In further embodiments, at least some of the ads use the Java language (or any similar language), such as for animation or for interactive features. In some embodiments, information associated with the formatted displays and/or with the selected portions of the content includes a type (or a preferred type) for at least some of the ad locations and/or times. For example, when a particular one of the selected portions of the content includes video content, at least one of the ads is preferred to be a video ad, such as a pre-roll ad having a location same as the particular selected portion of the content, and a time prior to showing the particular selected portion of the content.

In further embodiments, the content server obtains at least some of the ads from a multi-provider response selector (MPRS), such as multi-provider ad selector 126 as illustrated in FIG. 1A. For example, the content server uses information associated with a particular one of the requests to retrieve a particular one of the selected portions of the content, and also uses the same information and/or other information associated with the particular request to generate one or more ad requests for the multi-provider ad selector (MPAS), such as one ad request for each of a plurality of ad locations/times on a web page or a WAP page. Each ad request includes ad selection criteria (used by an ad provider to attempt to fill an ad matching the ad selection criteria), and/or ad provider selection criteria (used by the MPAS to select and/or to prioritize among a plurality of ad providers). For each ad request, the MPAS attempts to fill the ad from a plurality of ad providers (such as ad providers 106 as illustrated in FIG. 1A). In various embodiments, by using a plurality of ad providers, the MPAS obtains a higher ad fill rate than is obtained with a single ad provider. In further embodiments, by using ad provider selection criteria to select and/or to prioritize among a plurality of ad providers, the MPAS achieves ones or more of: higher fill rates; faster response times; and greater revenue.

In some embodiments and/or usage scenarios, at least some of the ads are displayed in a temporal (time) relationship to each other, and/or to a particular one of the selected portions of the content. In further embodiments, ads optionally have other properties, such as transparency (for example, logos that "see-through"). In a first example, a video ad has a location identical to the particular selected portion of the content, and is indicated to be either "pre-roll" (shown prior to the particular selected portion of the content), or "post-roll" (shown subsequent to the particular selected portion of the content). In a second example, a second ad has a location overlapping the particular selected portion of the content, and is indicated to be a bottom overlay (covering a stripe on the bottom of the particular selected portion of the content). Continuing the second example, the second ad is associated with a time duration (such as a duration of the second ad relative to a start of the particular selected portion of the content), and the bottom overlay is only present for the time duration. Accordingly, herein, ads are referred to as having a location and a time (a location/time).

In some embodiments, a multi-provider ad selector (MPAS) receives an ad request including ad selection criteria, retrieves a selected ad from a plurality of ad providers using the ad selection criteria, and returns the selected ad in response to the ad request. The ad selection criteria include factors such as one or more of: keywords, such as keywords associated with a content request for a selected portion of content of a content server; a type or a preferred type for the selected ad (e.g., a preference for a video ad); demographic and/or geographic information associated with an originator and/or a source of the content request; a service provider and/or internet service provider used, at least in part, to transmit the content request; a type and/or a model of device used to transmit the content request; a network locator accessed and/or used by the content request; information related to and/or associated with other ads displayed on a same page; user history information, such as browser history (for example, from cookies in a browser); and user profile information associated with the originator of the content request.

According to various embodiments, the keywords are determined according to factors such as one or more of: the content request; a selected portion of content retrieved in response to the content request; a content source from which the selected portion of content was derived; a location/time on a formatted display; information related to and/or associated with other ads selected to be included with the formatted display; demographic, geographic, and/or user profile information of a user originating the content request; user history information of a user originating the content request; and ad tags associated with any of the foregoing.

According to various embodiments, user profile information of the originator of the content request (the user) is determined according to one or more of: an account (such as an account associated with a content source) to which the user is logged in; an account to which the user is required to log in to access certain content; an account of the user with a service provider (such as a cellular network service provider); and any other account and/or profile information retrievable from other available information, such as information associated with the device used to transmit the content request.

According to various embodiments, the user history information is determined from a history of previous accesses and/or operations by the user as tracked and/or maintained by one or more of: cookies in a browser; the content server; and a web site accessed by the user, such as a web site associated with an account of the user. According to various embodiments, a content server maintains user history information according to one or more of: user identification (such as associated with user profile information or with cookies in a browser; device information (such as by associating the user history information with the device used to transmit the content request); and other techniques for user identification. According to various embodiments, user history information maintained by a content server includes one or more of: sites visited by the user; information on click-through (following ads) of the user, such as specific ads or types of ads the user has followed; user and/or device geographical locations; user access patterns, such as frequency and time of day; devices used by the user, such as for sourcing content requests; and other similar information. In some embodiments, the content server applies learning algorithms to the user history information to determine, at least in part, the ad selection criteria.

In various embodiments and/or usage scenarios, requests sourced from certain types of devices, such as cellular telephones, enable gathering of certain categories of ad selection criteria. For example, a user originates a request from a cellular telephone to a content server for a video clip having winter sports scenes. In addition to content selection information provided by the user (such as a URL for the video clip), various other information is provided in the request, or is available from a cellular network service provider of the user. Keywords such as "ski," "winter sports," and "snow" are determinable from and/or are associated with the content selection information and/or the selected portion of the content retrieved in response to the request. A service provider used to transmit the request, such as a cellular network service provider, is determinable from information such as a network address of a source of the request, or a network address of an intermediate network node through which the request was transmitted. In some embodiments and/or usage scenarios, a type and/or a model of device that sourced the request is supplied with the request (such as in a header of the request), or is obtained by querying the device (by sending a message back to the device), or is obtained from the cellular network service provider. Information of the user originating the request is obtainable from the cellular network service provider, such as an age of the user, a residence address of the user, a current location of the user, etc. If the user is logged into an account (such as an account associated with a content source), or if the user is required to log in to an account to access certain content, user profile information of the account is obtainable. Any and/or all of this information is used to determine keywords and/or for ad selection criteria. In a first further example, a user originating a request is determined to be 23 years of age, and the ad is preferentially targeted to the user's age group. In a second further example, a cellular telephone sourcing a request is on a particular cellular network (e.g., Verizon), and the cellular telephone is a model made by Motorola, and the ad is preferentially targeted to Verizon users and/or to those owning Motorola products.

According to various embodiments, the MPAS is one or more of: included in a content server; a computer and/or a computer system co-located and/or optionally sharing resources with a content server; and a computer and/or a computer system independent of a content server. In a first example, an MPAS is a stand-alone computer system that is accessible by one or more content servers to provide selected ads in response to ad requests from the content servers. In a second example, an MPAS is a software module executing as part of a content server, and is responsive to ad requests generated according to respective content requests for selected portions of content stored on the content server. In a third example, MPAS functionality is integrated into a content server, so that a same software system performs the content server and the MPAS functions. In a fourth example, an MPAS and a content server are respective software modules executing on a distributed server, and resources of the distributed server are optionally and/or selectively allocated to the MPAS and/or to the content server based on factors such as workload.

In some embodiments, an ad request received at an MPAS includes ad provider selection criteria. According to various embodiments, the ad provider selection criteria are used for one or more of: selecting one or more of a plurality of ad providers to selectively process the ad request; selecting a maximum number of the one or more ad providers to use to selectively process the ad request; and determining a priority ordering of ad providers to use to selectively process the ad request. In various embodiments, the ad provider selection criteria include factors such as those of the ad selection criteria (described above). In some embodiments, the ad provider selection criteria include ad provider statistics and/or information related to business arrangements with particular ones of the ad providers and/or with particular content sources. For example, a particular one of the content sources is also one of the ad providers, and the particular content source is preferentially used as an ad provider for requests for content of the particular content source. Continuing the example, a formatted display used for the content of the particular content source includes a plurality of locations/times for ads, and the particular content source is preferentially used as an ad provider solely for a particular one of the locations/times.

According to various embodiments, the ad provider statistics include one or more of: clicks per mille (thousand) impressions (CPM) and/or effective CPM (eCPM); cost per click (CPC); click-through rate (CTR); serve-through rate (STR); response time statistics, such as average response time and response time standard deviation; and any other ad provider statistics. In some embodiments, the ad provider statistics are provided by the respective ad provider. In some embodiments, the ad provider statistics are gathered by the MPAS and/or by the content server. In further embodiments, some of the statistics are historical. For example, eCPM information from a previous month is used by the MPAS to estimate eCPM for a current month. (eCPM is based, at least in part, on ad revenue, and thus is not, in some usage scenarios, determinable for a given period until after an ad provider shares revenue for the given period.)

In some embodiments, in response to a particular one of the ad requests, the MPAS uses the ad provider selection criteria to determine one or more of a plurality of ad providers, and optionally a number of the ad providers, to be used to attempt to fill the ad request. The MPAS optionally and/or selectively uses the ad provider selection criteria to determine a priority ordering of the one or more ad providers.

In some embodiments, the MPAS provides the ad selection criteria to the one or more ad providers wholly or partially in parallel (for example, not waiting for a response from a first one of the one or more ad providers prior to providing the ad selection criteria to a second one of the one or more ad providers). In further embodiments, the MPAS is configured to select a resultant ad as the highest, in the priority ordering, of any ads filled by the one or more ad providers, such as when a timeout period expires or after all of the one or more ad providers have responded. (The timeout period limits a duration of waiting for responses from the one or more ad providers, and, in various embodiments, starts in accordance with when the ad request is received or when the ad selection criteria are first provided to one of the one or more ad providers.) In other embodiments, the MPAS is configured to select a resultant ad as a first one of the ads filled by the one or more ad providers. The resultant ad is returned in response to the ad request.

In some embodiments, in response to a particular one of the ad requests, the MPAS provides the ad selection criteria to the one or more ad providers serially. In further embodiments, after providing the ad selection criteria to a first one of the one or more ad providers, the MPAS waits for a response from the first ad provider (and/or for a timeout period to expire) prior to providing the ad selection criteria to a second one of the one or more ad providers. (The timeout period limits a duration of waiting for a response from the first ad provider, and, in various embodiments, starts in accordance with when the ad request is provided to the first ad provider.) In some embodiments and/or usage scenarios, the MPAS provides the ad selection criteria to the one or more ad providers in the priority ordering. When a first one of the one or more ad providers fills a first ad according to the ad selection criteria, the MPAS selects the first ad as a resultant ad, and returns the resultant ad in response to the ad request.

In some embodiments, if none of the one or more ad providers are able to fill an ad according to the ad selection criteria, the MPAS uses a default ad as the resultant ad. In various embodiments and/or usage scenarios, the MPAS is always able to fill an ad (optionally and/or selectively according to the ad selection criteria), so that the resultant ad is always filled. Accordingly, in some embodiments, the MPAS is enabled to function as one of the ad providers. In further embodiments, the MPAS is used as one of the one or more ad providers, and is optionally and/or selectively a lowest-priority (in the priority ordering) one of the one or more ad providers.

In some embodiments, the MPAS and/or the content server store default ads provided by one or more of the ad providers. In further embodiments, the default ads are stored similarly to content of a content source. For example, video ones of the default ads are stored in one or more video formats. When a particular one of the default ads originates from a particular one of the ad providers, in various embodiments and/or usage scenarios, the MPAS accounts for the selection and/or the delivery of the particular default ad, and revenue is optionally and/or selectively obtained for the particular default ad from the particular ad provider.

According to various embodiments, an ad filled by a particular one of the ad providers (according to ad selection criteria of an ad request) is returned in one or more of: a source form, such as a portion of a web page (e.g., an HTML description) or a portion of a WAP page (e.g., a WML description); a video stream; any other source form; a reference (such as a URL) to source or a portion of source of the ad; and any combination of the foregoing. For example, the ad is returned at least in part as a URL (or other network locator) referencing content stored on a server of the particular ad provider. In further embodiments, the reference refers, either directly or indirectly, to content stored on a content server (and accordingly, the ad is a portion of the content stored on the content server). In a first example, the reference refers to specific content on the content server, such as a specific video clip. In a second example, the reference is a reference to original content provided by the particular ad provider to the content server (or to a content service provider operating the content server). The original content provided by the particular ad provider is stored on the content server in one or more formats, such as one or more video formats, and the content server is enabled to select an appropriate one of the one or more formats based on factors such as a type and/or a model of a device, such as a cellular telephone, that sourced the content request. Accordingly, in some embodiments, the particular ad provider is also a content source, and the reference to the ad is or is similar to a content request.

In some embodiments, the MPAS and/or the content server modifies the resultant ad for click-through. Any URLs (or other network locators) in and/or associated with the resultant ad are modified ("wrapped") so that the MPAS (and/or the content server) is a target of the URLs, and so that the URLs contain forwarding information to enable the MPAS (and/or the content server) to forward requests accessing the URLs on to respective original destinations (such as ad providers) of the URLs. In various embodiments, modifying URLs for click-through enables the MPAS (and/or the content server) to accumulate click-through statistics, such as click-through rate (CTR). For example, the resultant ad is provided as a URL, which the MPAS wraps so that use of the URL targets the MPAS. When a displayable version of the resultant ad is retrieved (via the wrapped URL), the MPAS acts as a middleman—a request for the displayable version of the resultant ad is forwarded (such as to a particular one of the ad providers), and a result returned (such as from the particular ad provider) is optionally and/or selectively similarly modified, wrapping any embedded URLs in the displayable version of the resultant ad so that the MPAS is a target of the embedded URLs. Accordingly, the MPAS also acts as a middle-man for any ads followed (click-through) by a user.

In some embodiments, an ad provider accounts for revenue from delivery of an ad when a reference to the ad, such as a URL, is accessed. For example, in response to an ad request, an ad provider returns a URL referencing the selected ad. The URL is included in a web page or a WAP page and provided to a user in response to a content request from the user. The display of the web page or the WAP page on a device of the user, such as a cellular telephone, causes the URL to be referenced to retrieve the ad for display, and when the ad is retrieved from the ad provider, the ad is considered to be delivered and revenue for the delivery of the ad is accrued. Continuing the example, the ad contains an embedded URL, and when the user clicks on the ad, the embedded URL is accessed from the ad provider, and click-through revenue of the ad is accrued.

In some embodiments, one or more of the ad providers (that is, respective operators of the one or more ad providers) shares ad revenue with the MPAS (that is, with an operator of the MPAS). According to various embodiments, the shared ad revenue is according to factors such as: ads filled by the ad provider; ads delivered by the MPAS; and click-through (by end users receiving the ads) on ads filled by the ad provider. In various embodiments, ad revenue received by the (operator of the) MPAS is maximized by preferentially selecting ad providers according to one or more factors such as eCPM, CTR, CPC, and/or STR.

In some embodiments, the MPAS and/or the content server (that is, an operator of the MPAS and/or the content server, such as a content service provider) shares ad revenue with one of the content sources (that is, with an operator of the one of the content sources). For example, a request is received at a content server for a selected portion of content stored on the content server, the selected portion of content derived from a portion of original content of a content source. The content server uses an MPAS to fill an ad (the ad provided by a particular one of a plurality of ad providers) that is returned along with the selected portion of the content, and revenue obtained from the ad (from the particular ad provider) is shared with the content source. In further embodiments, the content source has no business arrangement with the particular ad provider for the sharing of ad revenue. In still further embodiments, the content source is able to obtain a share of ad revenue from a plurality of ad providers, even though the content source does not have a business relationship with all of the ad providers. In various embodiments, the content source is also one of the ad providers.

While the above description attributes particular functions to a content server and other functions to an MPAS, other embodiments exist where the particular functions are performed by either or both of the content server and the MPAS.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A method including:
  receiving a request to retrieve selected content of a content server;
  determining, based at least in part on the request, response selection information;
  providing the response selection information to a first response provider; and
  if the first response provider is unable to fill a response according to the response selection information,
  providing the response selection information to a second response provider, and
  transmitting the selected content along with a response filled by the second response provider according to the response selection information.

EC2) The method of EC1, wherein the response filled by the second response provider includes an advertisement.

EC3) The method of EC1, further including receiving, from the second response provider, the response filled by the second response provider according to the response selection information.

EC4) The method of EC3, where the response filled by the second response provider is provided as a Uniform Resource Locator (URL).

EC5) The method of EC1, where the response selection information includes information associated with a network locator accessed by the request.
EC6) The method of EC1, where the selected content originated at a content source.
EC7) The method of EC6, where the response selection information includes information associated with an account of a user originating the request, the account associated with the content source.
EC8) The method of EC7, where the information associated with the account of the user includes user profile information.
EC9) The method of EC6,
further including receiving, at the content server, original content from the content source; and
transforming at least some of the original content to produce the selected content.
EC10) The method of EC9, where the transforming includes changing a video format.
EC11) The method of EC9, where the transforming includes producing a second video format from a first video format.
EC12) The method of EC1, where the transmitting is for display on a cellular telephone.
EC13) The method of EC12, where the transmitting is according to one or more of a model of the cellular telephone and a service provider to which the cellular telephone is connected.
EC14) The method of EC12, further including selecting the selected content according to one or more of a model of the cellular telephone and a service provider to which the cellular telephone is connected.
EC15) The method of EC12, where the response selection information includes demographic information of a registered user of the cellular telephone.
EC16) The method of EC15, where the demographic information includes an age of the registered user.
EC17) The method of EC12, where the response selection information includes geographic information of the cellular telephone.
EC18) The method of EC17, where the geographic information includes a country in which the cellular telephone is located.
EC19) The method of EC17, where the geographic information includes a country in which the cellular telephone is registered.
EC20) The method of EC17, where the geographic information includes a residence of a registered user of the cellular telephone.
EC21) The method of EC12, where the response selection information includes information associated with a service provider of the cellular telephone.
EC22) The method of EC12, where the transmitting is compatible with a native browser of the cellular telephone.
EC23) The method of EC1, where the selected content includes video content.
EC24) The method of EC1, further including, if the first response provider is able to fill a response according to the response selection information, transmitting the selected content along with the response filled by the first response provider according to the response selection information.
EC25) The method of EC24, further including receiving, from the first response provider, the response filled by the first response provider according to the response selection information.
EC26) The method of EC24, further including selecting the first response provider from among a plurality of response providers.
EC27) The method of EC26, where the plurality of response providers includes the second response provider.
EC28) The method of EC26, where the selecting is according to revenue obtainable from each of the response providers.
EC29) The method of EC26,
further including determining, based at least in part on the request, other response information; and
where the selecting is according to the other response information.
EC30) The method of EC29,
where the transmitting the selected content along with the response filled by the first response provider includes transmitting information of a formatted display that includes the selected content; and
where the other response information includes a location/time for a response within the formatted display.
EC31) The method of EC29, where the other response information includes information related to a network locator accessed by the request.
EC32) The method of EC31,
where the network locator is associated with a particular one of a plurality of content sources; and
where the selected content originated as content from the particular content source.
EC33) The method of EC29, where the other response information includes information related to an Internet Service Provider (ISP) associated with the request.
EC34) The method of EC29, where the other response information includes geographic information obtainable according to the request.
EC35) The method of EC34, where the geographic information includes a country associated with the request.
EC36) The method of EC29,
where the selected content originated at a content source; and
where the other response information includes information associated with an account of a user originating the request, the account associated with the content source.
EC37) The method of EC36, where the information associated with the account of the user includes user profile information.
EC38) The method of EC1, where the providing the response selection information to the first response provider is via a network.
EC39) The method of EC38, where the network includes the Internet.
EC40) The method of EC1, where the receiving the request is via a network.
EC41) The method of EC40, where the network includes the Internet.
EC42) The method of EC40, where the network includes a cellular telephone network.
EC43) A method including:
receiving content from a content source;
delivering portions of the content over a network along with respective ads selected for each of the portions of the content;
selecting each of the selected ads in accordance with a plurality of ad providers;
receiving revenue from at least some of the ad providers in response to the selected ads; and
sharing a portion of the revenue with the content source.

EC44) The method of EC43, where the selecting each of the selected ads in accordance with the ad providers includes selecting each of the selected ads from the ad providers.

EC45) The method of EC43, where the content source is one of the ad providers.

EC46) The method of EC45,
where a particular one of the portions of the content is delivered along with a plurality of the selected ads; and
where the selecting of the plurality of selected ads preferentially uses the content source as an ad provider for at least one of the plurality of the selected ads.

EC47) The method of EC43, where the receiving revenue from the at least some of the ad providers in response to the selected ads is in response to the delivering of the selected ads.

EC48) The method of EC47, where the receiving revenue from the at least some of the ad providers in response to the selected ads is, at least in part, in response to display of the selected ads.

EC49) The method of EC47, where the receiving revenue from the at least some of the ad providers in response to the selected ads is, at least in part, in response to click-through on the selected ads.

EC50) The method of EC43, further including transforming the content from the content source to produce the portions of the content.

EC51) The method of EC50, where the transforming includes changing a video format.

EC52) The method of EC50, where the transforming includes transforming a particular part of the content from the content source into a plurality of the portions of the content, each of the plurality of the portions of the content having a different video format.

EC53) The method of EC50, where the transforming includes transforming a particular part of the content from the content source into a plurality of versions, each of the versions having a different video format, and storing each of the versions as a respective one of the portions of the content.

EC54) The method of EC43, where the content source does not receive revenue directly from the ad providers for the delivering of the selected ads.

EC55) The method of EC43, where the content source does not have a business arrangement with the ad providers for the delivering of the selected ads.

EC56) The method of EC43, where the delivering of each of the portions of the content is in response to a respective request.

EC57) The method of EC56,
where the delivering of a particular one of the portions of the content is in response to a particular one of the respective requests, and the particular portion of the content is delivered along with a particular one of the respective selected ads; and
where the selecting of the particular selected ad includes
determining a first one of the ad providers, and
attempting to fill the particular selected ad from the first ad provider.

EC58) The method of EC57, where the determining is according to the particular request.

EC59) The method of EC58, where the determining is according to a network locator accessed by the particular request.

EC60) The method of EC58, where the determining is according to an Internet Service Provider (ISP) associated with the particular request.

EC61) The method of EC58, where the determining is according to geographic information obtainable according to the particular request.

EC62) The method of EC57, where the determining is according to revenue agreements with the ad providers.

EC63) The method of EC57, where the determining is according to information associated with an account of a user originating the particular request, the account associated with the content source.

EC64) The method of EC57,
where the delivering of the particular portion of the content includes delivering information of a formatted display including the particular portion of the content and the particular selected ad; and
where the determining is according to a location/time of the particular selected ad within the formatted display.

EC65) The method of EC57, where the selecting of the particular selected ad further includes, if the first ad provider is unable to fill the particular selected ad,
determining a second one of the ad providers, and
attempting to fill the particular selected ad from the second ad provider.

EC66) The method of EC65, where the selecting of the particular selected ad further includes, if the second ad provider is able to fill the particular selected ad, receiving the particular selected ad from the second ad provider.

EC67) The method of EC57, where the selecting of the particular selected ad further includes,
determining ad selection criteria based, at least in part, on the particular request, and
providing the ad selection criteria to the first ad provider.

EC68) The method of EC67, where the selecting of the particular selected ad further includes, if the first ad provider is able to fill the particular selected ad according to the ad selection criteria, receiving the particular selected ad from the first ad provider.

EC69) The method of EC56,
where the delivering of a particular one of the portions of the content is in response to a particular one of the respective requests, and the particular portion of the content is delivered along with a particular one of the respective selected ads; and
where the selecting of the particular selected ad includes
determining ad selection criteria based, at least in part, on the particular request, and
attempting to fill the particular selected ad from two or more of the ad providers according to the ad selection criteria.

EC70) The method of EC69, where the selecting of the particular selected ad further includes
computing a priority ordering of the two or more ad providers based, at least in part, on the particular request, and
choosing as the particular selected ad a highest priority, in the priority ordering, one of ads filled by the two or more ad providers according to the ad selection criteria.

EC71) The method of EC70,
where a multi-provider ad selector is enabled to perform the selecting; and
where the multi-provider ad selector is a lowest priority, in the priority ordering, one of the two or more ad providers.

EC72) The method of EC56, where at least some of the requests are from cellular telephones.

EC73) The method of EC43, where at least some of the portions of the content include video content.

EC74) A method including:
receiving content from a content source;
delivering portions of the content over a network along with respective ads selected for each of the portions of the content;
selecting each of the selected ads from a plurality of ad providers;
obtaining compensation from at least some of the ad providers in response to the selected ads; and
providing a portion of the compensation to the content source.

EC75) A method including:
receiving content from a content source;
delivering portions of the content over a network along with respective ads selected for each of the portions of the content;
selecting each of the selected ads from a plurality of ad providers;
obtaining compensation from at least some of the ad providers in response to the selected ads; and
recompensing the content source according to the obtained compensation.

EC76) A method including:
receiving content from a content source;
delivering portions of the content over a network along with respective ads selected for each of the portions of the content;
selecting, by a multi-provider ad selector, each of the selected ads from a plurality of ad providers;
obtaining remuneration from at least some of the ad providers in response to the selected ads; and
apportioning the remuneration between the content source and the multi-provider ad selector.

EC77) The method of EC76, further including receiving, by the content source, the remuneration.

EC78) The method of EC79, further including distributing, by the content source, a portion of the remuneration according to the apportioning to the multi-provider ad selector.

EC79) The method of EC76, further including receiving, by the multi-provider ad selector, the remuneration.

EC80) A method including:
storing, as part of content of a content server, stored ads, each of the stored ads derived from a respective portion of original content of at least one ad provider, each of the stored ads stored as one or more respective versions, each of the respective versions in a respective one of a plurality of video formats;
receiving, at the content server and from a requester, a content request for a portion of the content stored in the content server, the portion of the content other than the stored ads;
determining, based at least in part on the content request, one or more ads;
returning the portion of the content and the one or more ads to the requester; and
where at least one of the one or more ads is one of the stored ads.

EC81) The method of EC80, where at least some of the stored ads are default ads.

EC82) The method of EC81, where the determining of a particular one of the one or more ads is performed, at least in part, by a multi-provider ad selector.

EC83) The method of EC82, where the determining of the particular ad by the multi-provider ad selector includes providing ad selection criteria to one or more ad providers.

EC84) The method of EC83, where the determining of the particular ad by the multi-provider ad selector further includes, if none of the one or more ad providers is able to fill an ad according to the ad selection criteria, selecting one of the defaults ads as the particular ad.

EC85) The method of EC84, where the selecting is according to the ad selection criteria.

EC86) The method of EC80, where at least one of the one or more ads is not one of the stored ads.

EC87) The method of EC80, where the storing is in two or more of the video formats.

EC88) The method of EC80, where the returning uses a particular one of the video formats according to a device sourcing the content request.

EC89) The method of EC88, where the returning returns the at least one of the one or more ads using the respective version in the particular video format.

EC90) The method of EC80, where the returning includes returning a formatted display including the portion of the content and the one or more ads.

EC91) The method of EC80, where the determining of a particular one of the one or more ads is from a plurality of ad providers.

EC92) The method of EC80, where the determining is performed, at least in part, by a multi-provider ad selector.

EC93) A method including:
obtaining ad selection criteria;
determining a priority ordering of two or more ad providers;
receiving, using the priority ordering, a resultant ad from among one or more ads filled according to the ad selection criteria by at least some of the two or more ad providers.

EC94) The method of EC93, further including selecting the two or more ad providers from among a plurality of ad providers.

EC95) The method of EC94, where the selecting is according to the ad selection criteria.

EC96) The method of EC94,
further including obtaining other ad information; and
where the selecting is according to the other ad information.

EC97) The method of EC94, where the selecting is according to revenue obtainable from each of the two or more ad providers.

EC98) The method of EC93, further including accruing revenue from at least one of the ad providers.

EC99) The method of EC98, where the accruing the revenue is according to the receiving.

EC100) The method of EC98, further including delivering the resultant ad to a content server.

EC101) The method of EC100, where the accruing the revenue is according to the delivering.

EC102) The method of EC100, where the obtaining the ad selection criteria is from the content server.

EC103) The method of EC100, further including determining a share of the revenue for the content server.

EC104) The method of EC98,
where the obtaining is from a content service provider; and
where the accruing the revenue is according to delivery of the resultant ad via the content service provider.

EC105) The method of EC98, where the accruing the revenue is according to displaying the resultant ad.

EC106) The method of EC93, further including providing the ad selection criteria to the two or more ad providers.

EC107) The method of EC106, further including terminating the providing when a first one of the ad providers returns a first ad according to the ad selection criteria; and where the resultant ad is the first ad.

EC108) The method of EC106, further including terminating the providing when all of the ad providers have declined to provide an ad.

EC109) The method of EC108, further including terminating the providing when all of the ad providers have declined to provide an ad or when a timeout period expires, whichever is sooner.

EC110) The method of EC108, further including using a default ad as the resultant ad when all of the ad providers have declined to provide an ad.

EC111) The method of EC110, further including selecting the default ad according to the ad selection criteria.

EC112) The method of EC106, where the providing provides the ad selection criteria to the ad providers serially.

EC113) The method of EC106, where the providing includes waiting for a response from a particular one of the ad providers prior to providing the ad selection criteria to a subsequent one of the ad providers.

EC114) The method of EC113, where the waiting for the response from the particular ad provider includes stopping the waiting when a timeout period expires.

EC115) The method of EC106, where the providing provides the ad selection criteria to the ad providers in the priority ordering.

EC116) The method of EC115, where the priority ordering is based, at least in part, on revenue obtainable from each of the ad providers.

EC117) The method of EC115, where the priority ordering is based, at least in part, on a location/time within a page in which the resultant ad will be displayed.

EC118) The method of EC115, where the priority ordering is based, at least in part, on a location/time where the resultant ad will be displayed.

EC119) The method of EC115, where the priority ordering is based, at least in part, on a request for content stored in a content server.

EC120) The method of EC119, further including determining the ad selection criteria based, at least in part, on the request.

EC121) The method of EC106, where the providing is wholly or partially in parallel; and where the receiving includes selecting the resultant ad according to the priority ordering from among the one or more ads filled according to the ad selection criteria.

EC122) The method of EC93, where the ad selection criteria are determined according to a request for content stored in a content server.

EC123) The method of EC93, further including:

receiving, at a content server, a request for content; and determining the ad selection criteria based, at least in part, on the request.

EC124) The method of EC123, further including determining ad provider selection criteria; and where the priority ordering is according to the ad provider selection criteria.

EC125) The method of EC124, where the determining the ad provider selection criteria is at the content server.

EC126) The method of EC124, where the ad provider selection criteria include a location/time within a page in which the resultant ad will be displayed.

EC127) The method of EC124, where the ad provider selection criteria are based, at least in part, on the request.

EC128) The method of EC127, where the ad provider selection criteria are based, at least in part, on a network locator accessed by the request.

EC129) The method of EC127, where the ad provider selection criteria are based, at least in part, on an Internet Service Provider (ISP) associated with the request.

EC130) The method of EC127, where the ad provider selection criteria are based, at least in part, on a geographic location associated with the request.

EC131) The method of EC127, where the ad provider selection criteria are based, at least in part, on an account of a user originating the request.

EC132) The method of EC131, where the account is associated with a content source; and where the content server obtains the content from the content source.

EC133) The method of EC93, where the obtaining is from a content service provider; and further including returning the resultant ad to the content service provider.

EC134) The method of EC93, where the ad selection criteria include keywords.

EC135) A system including:

a content server hosting content and configured to receive a plurality of content requests to transmit respective specified portions of the content, and generate, for each of at least some of the content requests, a respective ad request, the respective ad request including respective ad selection criteria; and a multi-provider ad selector configured, for each of the ad requests, to retrieve a respective ad from a plurality of ad providers according to the respective ad selection criteria; and where each of the at least some of the content requests is associated with the respective ad retrieved via the respective ad request.

EC136) The system of EC135, where at least some of the specified portions of the content include video content.

EC137) The system of EC135, where, for each of the at least some of the content requests, the content server is further configured to transmit the respective specified portion of the content along with the associated ad.

EC138) The system of EC137, where each of at least some of the associated ads is in a form of a respective URL, the respective URL referencing content of the associated ad.

EC139) The system of EC137, where the at least some of the content requests are sourced from respective cellular telephones.

EC140) The system of EC139, where, for each of the at least some of the content requests, the content server is further configured to transmit the respective specified portion of the content along with the associated ad to the respective cellular telephone.

EC141) The system of EC135, where the multi-provider ad selector is further configured, for each of the ad requests, to select among the ad providers according to respective revenue agreements.

EC142) The system of EC135, where each of the respective ad requests further includes respective other ad information.

EC143) The system of EC142, where the multi-provider ad selector is further configured, for each of the ad requests, to select among the ad providers according to the respective other ad information.

EC144) The system of EC142, where the respective other ad information includes information according to a network locator accessed by the particular one of the content requests having the respective ad request.

EC145) The system of EC142, where the respective other ad information includes information according to an Internet Service Provider (ISP) associated with the particular one of the content requests having the respective ad request.

EC146) The system of EC142, where the respective other ad information includes information according to a geographic location obtainable via the particular one of the content requests having the respective ad request.

EC147) The system of EC142, where the respective other ad information is based, at least in part, on an account of a respective user originating the particular one of the content requests having the respective ad request.

EC148) The system of EC147,
where the account is associated with a content source; and
where the content server obtains the respective specified portion of the content of the particular content request from the content source.

EC149) The system of EC135, where the multi-provider ad selector is further configured, for each of the ad requests, to
determine a first one of the ad providers, and
attempt to fill the respective ad from the first ad provider.

EC150) The system of EC149, where the multi-provider ad selector is further configured, for each of the ad requests, to determine the first one of the ad providers according to the respective ad selection criteria.

EC151) The system of EC149, where the multi-provider ad selector is further configured, for each of the ad requests, if the first ad provider is unable to fill the particular selected ad, to
determine a second one of the ad providers, and
attempt to fill the respective ad from the second ad provider.

EC152) The system of EC151, where the multi-provider ad selector is further configured, for each of the ad requests, if the second ad provider is able to fill the respective ad, to retrieve the respective ad from the second ad provider.

EC153) A multi-provider ad selector including:
a network interface to receive ad requests and to transmit respective selected ads, the ad requests including respective ad selection criteria; and
a computer coupled to the network interface, and configured, for each of the ad requests, to
determine two or more of a plurality of ad providers and a priority ordering of the two or more ad providers, and
select, using the priority ordering, the respective selected ad from among one or more ads filled according to the respective ad selection criteria by at least some of the two or more ad providers.

EC154) The multi-provider ad selector of EC153, where the computer is further configured, for each of the ad requests, to select a respective default ad as the respective selected ad if none of the two or more ad providers are able to fill an ad according to the respective ad selection criteria.

EC155) The multi-provider ad selector of EC154, where the computer is further configured, for each of the ad requests, to select the respective default ad according to the respective ad selection criteria.

EC156) The multi-provider ad selector of EC153, where the priority ordering is based, at least in part, on respective revenue arrangements with each of the two or more ad providers.

EC157) The multi-provider ad selector of EC153,
where each of the ad requests further includes respective other ad information; and
where the priority ordering is based, at least in part, on the respective other ad information.

EC158) The multi-provider ad selector of EC157, where the respective other ad information includes a respective location/time in a page display for the respective selected ad.

EC159) The multi-provider ad selector of EC157, where the respective other ad information includes information according to a network site associated with the ad request.

EC160) The multi-provider ad selector of EC159, where the network site is associated with a content source.

EC161) The multi-provider ad selector of EC157, where the respective other ad information includes information according to an Internet Service Provider (ISP) associated with the ad request.

EC162) The multi-provider ad selector of EC157, where the respective other ad information includes information according to a geographic location associated with the ad request.

EC163) The multi-provider ad selector of EC157, where the respective other ad information is based, at least in part, on an account of a respective user associated with the ad request.

EC164) The multi-provider ad selector of EC153, where the computer is further configured to
provide the respective ad selection criteria to the two or more ad providers in the priority ordering, and
terminate the providing when a first one of the two or more ad providers provides the respective selected ad.

EC165) The multi-provider ad selector of EC164, where the computer is further configured to provide the respective ad selection criteria serially to the two or more ad providers in the priority ordering.

EC166) The multi-provider ad selector of EC165, where the computer is further configured to wait for a response from a first one of the two or more ad providers prior to providing the respective ad selection criteria to a subsequent one of the two or more ad providers.

EC167) The multi-provider ad selector of EC166, where the response includes an indication of an inability to fill an ad according to the respective ad selection criteria.

EC168) The multi-provider ad selector of EC153, where the computer is further configured to provide the respective ad selection criteria to the two or more ad providers.

EC169) The multi-provider ad selector of EC168, where the computer is further configured to select the respective selected ad according to the at least some of the two or more ad providers.

EC170) The multi-provider ad selector of EC168, where the computer is further configured to perform the selecting prior to all of the two or more ad providers responding to the providing.

EC171) The multi-provider ad selector of EC170, where the computer is further configured to perform the selecting after a timeout period has elapsed.

EC172) The multi-provider ad selector of EC170, where the computer is further configured to perform the selecting after a highest-priority subset, in the priority ordering, of the two or more ad providers have all returned a response to the providing, and at least one of the highest-priority subset of the two or more ad providers has filled an ad according to the respective ad selection criteria.

EC173) An apparatus including:
means for receiving an ad request, the ad request including ad selection criteria;
means for providing the ad selection criteria to a plurality of ad providers, the means for providing including a network interface; and
means for selecting an ad from among one or more respective ads filled by ones of the plurality of ad providers according to the ad selection criteria.

EC174) The apparatus of EC173, where the means for providing is configured to wait for a response from a first one of the ad providers prior to providing the ad selection criteria to a second one of the ad providers.

EC175) The apparatus of EC173, where the means for selecting is according to respective revenue agreements with each of the ad providers.

EC176) A computer-readable medium having a set of instructions stored therein which when executed by a computer causes the computer to perform procedures including the elements of any one of the methods of EC1 through EC134.

EC177) A method including:
requesting, from a user device, requested content of a content server;
receiving, by the user device, a formatted display including the requested content and a plurality of elements of additional content;
clicking through, by a user of the user device, on one of the elements of additional content;
wherein the content server is configured to retrieve the requested content, and to request each of the elements of additional content from a multi-provider response selector;
wherein the multi-provider response selector is configured to request each of the elements of additional content from a plurality of response servers; and
wherein the clicking through is directed to and/or accounted by the multi-provider response selector.

System and Operation

Figure 1B:
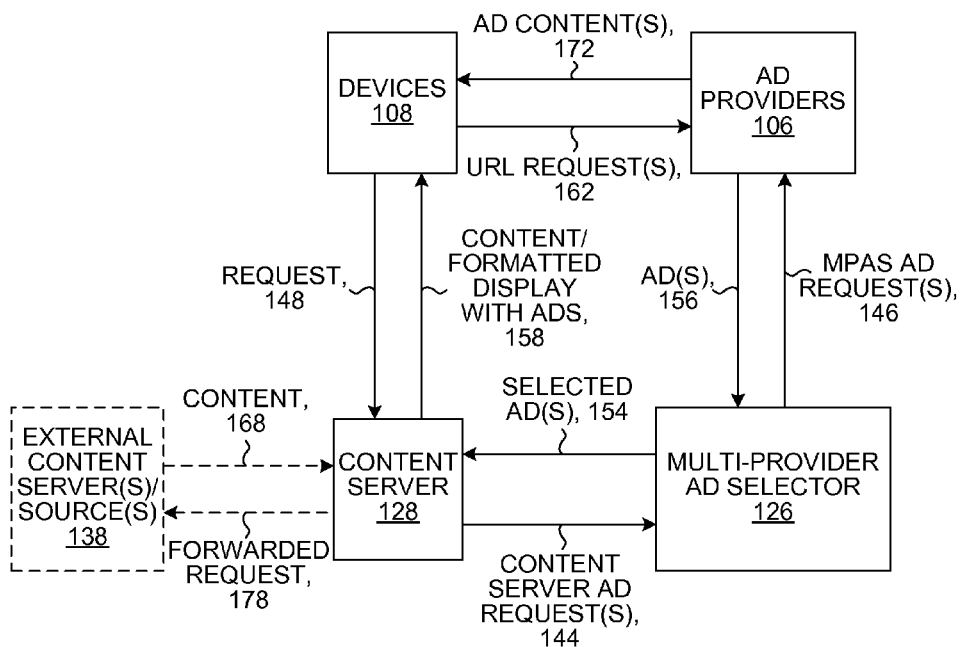
FIG. 1B illustrates selected details of a flow of requests and data in the system of FIG. 1A.
Figure 1C:
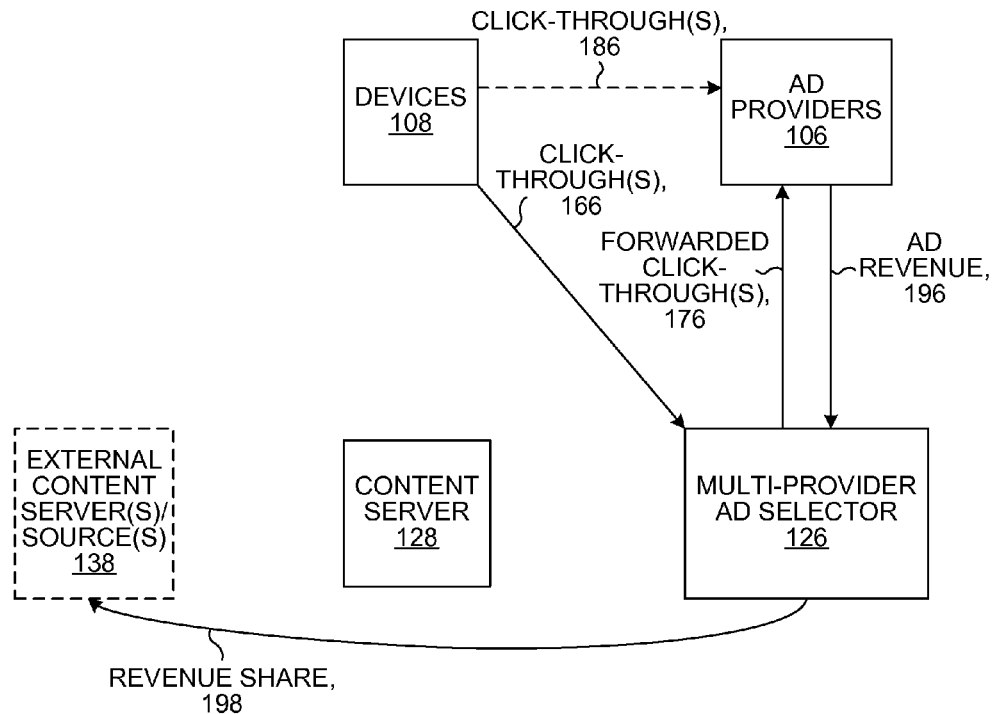
FIG. 1C illustrates selected details of a flow of information and revenue in the system of FIG. 1A.

FIG. 1A illustrates selected details of an embodiment of a system including a multi-provider ad selector. FIG. 1B illustrates selected details of a flow of requests and data in the system of FIG. 1A. FIG. 1C illustrates selected details of a flow of information and revenue in the system of FIG. 1A.

As illustrated in FIG. 1A, the system includes devices 108, content server 128, multi-provider ad selector 126, ad providers 106, and optionally external content server(s)/source(s) 138. In some embodiments, content server 128 and multi-provider ad selector 126 are each independent computers and/or computer systems. In other embodiments, content server 128 and multi-provider ad selector 126 are portions of server 124. In further embodiments, content server 128 and/or multi-provider ad selector 126 are software modules executing on server 124. According to various embodiments, server 124 is one or more of: a distributed server; a clustered server; and any other type of computer system.

Network 118 couples devices 108 to content server 128. Network 116 couples multi-provider ad selector 126 to ad providers 106. Network 110 couples content server 128 to multi-provider ad selector 126. According to various embodiments, any and/or all of network 118, network 116, and network 110 are and/or include one or more of: a same network; portions of a same network; coupled networks, such as bridged networks or routed networks; a local-area network; a wide-area network; the Internet; a cellular telephone network; a wireless network; an optical network; an EvDO network; a GPRS network; an EDGE network; an HSDPA and/or HSUPA network; a WiMAX network; a UMTS LTE network; any other cellular and/or mobile communication network; and any other network communication medium. In various embodiments, such as some embodiments where content server 128 and multi-provider ad selector 126 are portions of server 124, network 110 is and/or includes an intra-server communications medium, such as one or more of: shared memory communication; inter-processor messaging; remote procedure call; a backplane bus; a PCI bus; a PCI Express bus; an InfiniBand® link; a HyperTransport™ link; and any other intra-server or network communication medium.

Devices 108 include one or more devices capable of transmitting requests to content server 128 via network 118, such as cellular telephones as exemplified by 108.2, Personal Digital Assistants (PDAs) as exemplified by 108.1, and Personal Computers (PCs) as exemplified by 108.3. FIG. 1A illustrates three exemplary devices for devices 108. Of course, there can be any number of devices providing requests to content server 128, optionally and/or selectively limited by factors such as network bandwidth and capacity of content server 128. In various embodiments, network 118 includes cellular telephone networks of one or more cellular telephone network providers, and a first one of devices 108 uses a first one of the cellular telephone networks to transmit a request to content server 128, and a second one of devices 108 uses a second one of the cellular telephone networks to transmit a request to content server 128.

Ad providers 106 include one or more devices capable of filling ads in response to ad requests from multi-provider ad selector 126 via network 116. As illustrated in FIG. 1A, there are three ad providers 106.1, 106.2, and 106.3. Of course, there can be any number of ad providers filling ads in response to requests from multi-provider ad selector 126, optionally and/or selectively limited by factors such as network bandwidth and capacity of multi-provider ad selector 126.

External content server(s)/source(s) 138 are illustrated as being coupled to content server 128 via network 118. According to various embodiments, external content server(s)/source(s) 138 are coupled to content server 128 via one or more of: network 118; a physical medium, such as content delivery on compact discs or DVDs; and any other network communication medium. In some embodiments, external content server(s)/source(s) 138 are a content source for at least some content of content server 128. According to various embodiments, external content server(s)/source(s) 138 include one or more of: a content server similar to content server 128; a streaming content server, such as a streaming video content server hosting a large number of user-provided videos; a content source, such as an ad provider or a media company; and any other content server or content source.

The following paragraphs describing FIGS. 1A-1C are an example of usage of the system illustrated in FIGS. 1A-1C, and are not intended to limit a scope of the techniques described herein, but merely to illustrate one of many examples of usage of the system illustrated in FIGS. 1A-1C.

A user of a particular one of devices 108, such as a user of cellular telephone 108.2 (as illustrated in FIG. 1A), originates a content request (request 148 as illustrated in FIG. 1B) to content server 128, and the content request is sourced by the particular device. The content request includes information such as one or more of: a content selection of the user, such as a URL and/or content search criteria; and information associated with network addresses and/or identifiers of the particular device. Content server 128 (operated by a content service provider) receives the content request, and retrieves a portion of content stored in content server 128 according to the content selection.

In various embodiments, at least some of the content stored in content server 128 is provided as content 168 (as illustrated in FIG. 1B) by external content server(s)/source(s) 138. Content 168 is optionally and/or selectively transformed (such as by being processed and/or reformatted) by (or under control of) content server 128, and is optionally and/or selectively stored in content server 128 in one or more versions. In some embodiments and/or usage scenarios, content 168 is retrieved in response to request 148 (as illustrated in FIG. 1B), such as by forwarding a request (forwarded request 178) to external content server(s)/source(s) 138 in response to request 148. In other embodiments and/or usage scenarios, content 168 is provided independent of request 148, such as in response to a previous request, or according to a business arrangement with the content service provider.

In some embodiments, each of one or more of ad providers 106 assigns a respective content provider tag to each of one or more of external content server(s)/source(s) 138. In further embodiments, the respective content provider tags are unique, such as by being a unique identifier, for each of external content server(s)/source(s) 138. In still further embodiments, the respective content provider tags are optionally also unique for each of ad providers 106, and each of the respective content provider tags specifies a pair of one of external content server(s)/source(s) 138 and one of ad providers 106. According to various embodiments, the respective content provider tags are one or more of: sent as part of or in association with content 168 when content 168 is provided from external content server(s)/source(s) 138 to content server 128; and stored on content server 128 and associated, such as via a network address or domain name, with content 168 when content 168 is provided from external content server(s)/source(s) 138.

In some embodiments, content server 128 uses information in the content request to determine and/or to obtain additional information. The information (including the information in the content request and/or the additional information) is used to determine ad selection criteria and/or ad provider selection criteria. The information includes factors such as: a hostname or domain name, such as in a URL of the content request; an age of the user; a residence of the user, such as a country, a state, and/or a city; a current location of the user, such as a country, a state, and/or a city; an income of the user; a credit card and/or credit information of the user; a type and/or a model of the particular device; a service provider, such as a cellular telephone network provider, used to transmit the content request from the particular device; user profile information from an account of the user with an organization, such as a content source or a service provider; and any other information related to or associated with the user and/or the particular device.

In a first example, a network address associated with the particular device is used to identify a service provider, such as a cellular telephone network provider, used to connect the particular device to content server 128, and additional information related to the particular device and/or to the user is obtained from the service provider. In a second example, the content request is used to determine an organization, such as a content source associated with the content selection, or a service provider associated with the particular device. An account of the user with the organization is accessed (optionally and/or selectively by having the user log in to the account), and user profile information is obtained.

From information in, determined, or obtained from the content request (such as a network locator containing a hostname or domain name identifying a particular part of the content stored on content server 128), and/or from information in the portion of the content, content server 128 is configured to generate a formatted display (such as a web page or a WAP page) to return in response to the content request. The formatted display includes a location for the portion of the content, and one or more locations/times where ads are to be inserted. For each of at least some of the locations/times where an ad is to be inserted, content server 128 generates a respective ad request to multi-provider ad selector 126 to fill the ad (such as one of content server ad request(s) 144 as illustrated in FIG. 1B). According to various embodiments, one or more of: each of the ad requests includes respective ad selection criteria and/or respective ad provider selection criteria; and each of the ad requests includes respective information, such as the information in, determined, or obtained from the content request, from which multi-provider ad selector 126 is enabled to determine respective ad selection criteria and/or respective ad provider selection criteria. In some embodiments, the respective ad selection criteria and/or ad provider selection criteria include the location/time where the ad is to be inserted. In some embodiments, the respective ad provider selection criteria include ad provider statistics, such as an eCPM for each of the ad providers. In various embodiments, multi-provider ad selector 126 maintains ad provider statistics for one or more of the ad providers, and uses the ad provider statistics in conjunction with the respective ad provider selection criteria.

In some embodiments and/or usage scenarios, each at least some of the ad requests includes the respective content provider tags of a particular one of external content server(s)/source(s) 138 that originated the portion of the content. In further embodiments, the respective content provider tags are included as part of the ad selection criteria. For example, the portion of the content was initially provided by a broadcast network, and each of at least some of the ad requests includes the respective content provider tags of the broadcast network (each of the respective content provider tags of the broadcast network associated with one or more of ad providers 106).

Multi-provider ad selector 126 receives the ad requests, and for each of the ad requests selects a respective resultant ad to fill the ad request. In some embodiments, multi-provider ad selector 126 is always able to select a respective resultant ad to fill the ad request. The respective resultant ad is returned to content server 128 in response to the respective ad request (such as one of selected ad(s) 154 as illustrated in FIG. 1B). Content server 128 returns, in response to the content request, the portion of the content along with the resultant ads in the formatted display (such as content/formatted display with ads 158 as illustrated in FIG. 1B).

For each of the ad requests, to enable selecting an ad according to the ad selection criteria, multi-provider ad selector 126 is configured to determine (according to the ad provider selection criteria) one or more of: which one or more of a plurality of ad providers to use; a maximum number of the ad providers to use; and a priority ordering of determined ones of the ad providers. Multi-provider ad selector 126 provides the ad selection criteria to at least some of the determined ad providers (such as via MPAS ad request(s) 146 as illustrated in FIG. 1B), optionally and/or selectively in the priority ordering, and zero or more of the determined ad providers return a respective filled ad in response to the providing (such as via ad(s) 156 as illustrated in FIG. 1B). Multi-provider ad selector 126 optionally and/or selectively uses the priority ordering to select one of the filled ads, if any, as a resultant ad, or (acting as an ad provider) is able to provide a default ad, optionally and/or selectively according to the ad selection criteria, as the resultant ad if none of the determined ad providers is able to fill an ad according to the ad selection criteria. In some embodiments, multi-provider ad selector 126 is treated as a last one (in the priority ordering) of the determined ad providers, and multi-provider ad selector 126 is always able to fill an ad according to the ad selection criteria. Multi-provider ad selector 126 returns the resultant ad (such as one of selected ad(s) 154 as illustrated in FIG. 1B) in response to the ad request.

In various embodiments, for each of at least some of the ad requests and further for each of the at least some of the determined ad providers, multi-provider ad selector 126 is configured to include in the ad selection criteria sent to the ad provider the respective content provider tag of the ad provider (such as provided with the ad request by content server 128). Each of the at least some of the determined ad providers is enabled, using the respective content provider tag, to accrue revenue for a particular one of external content server(s)/source(s) 138 having the respective content provider tag (such as the particular one of external content server(s)/source(s) 138 that originated the portion of the content). For example, if a particular one of the ad providers is the one of the ad providers that fills the resultant ad, then revenue according to the resultant ad (such as from delivery and/or display of ad content of the resultant ad, or from click-through on the ad content) is shared with the one of external content server(s)/source(s) 138 having the respective content provider tag sent to the particular ad provider.

In some embodiments, a particular one of the ad providers receives the ad selection criteria in a respective message, and the message has an associated source (such as a source identified by a source network address of the message, for example the network address of multi-provider ad selector 126). The particular ad provider is configured to share revenue obtained according to the ad selection criteria (such as from delivery and/or display of ad content of the resultant ad, or from click-through on the ad content, if the particular ad provider is able to fill the resultant ad) with the associated source.

In some embodiments, multi-provider ad selector 126 provides the ad selection criteria to the determined ad providers serially, such as by waiting for a response from a first one of the determined ad providers (or, optionally, for a timeout period to elapse) prior to providing the ad selection criteria to a second one of the determined ad providers. In further embodiments, multi-provider ad selector 126 provides the ad selection criteria to the determined ad providers serially in the priority ordering. When a first one of the determined ad providers returns a first ad according to the ad selection criteria, the first ad is selected as the resultant ad, and, in various embodiments, the providing is terminated.

In other embodiments, multi-provider ad selector 126 provides the ad selection criteria to the determined ad providers wholly or partially in parallel. According to various embodiments, the resultant ad is selected after one or more of: all of the determined ad providers have returned a response to the providing; a timeout period has expired; and a highest-priority (in the priority ordering) subset of the determined ad providers have all returned a response to the providing, and at least one of the highest priority subset has filled an ad according to the ad selection criteria. (A highest-priority subset of a set is a subset of the set, including a proper subset, where all members of the set not in the subset are of a lower priority than any of the members of the subset.) In some embodiments, multi-provider ad selector 126 acts as a lowest-priority (in the priority ordering) one of the determined ad providers, the determined ad providers always provide one or more ads filled according to the ad selection criteria, and the highest-priority (in the priority ordering) one of the ads filled according to the ad selection criteria is selected as the resultant ad. In other embodiments, if none of the determined ad providers have filled an ad according to the ad selection criteria, the resultant ad is provided by multi-provider ad selector 126 as a default ad optionally and/or selectively selected according to the ad selection criteria.

In some embodiments, ad(s) 156 (as illustrated in FIG. 1B) are returned as references to the resultant ads, such as respective ad URLs. In further embodiments, the ad URLs are optionally and/or selectively wrapped by multi-provider ad selector 126, so that uses of the ad URLs (such as when displaying the resultant ads) are sent to multi-provider ad selector 126, which then forwards the uses to a respective original destination (such as one of ad providers 106). The (optionally and/or selectively wrapped) ad URLs are included as part of content/formatted display with ads 158 returned to the particular device. When the particular device displays content/formatted display with ads 158, the ad URLs are accessed, generating corresponding URL request(s) 162, which are sent to ad providers 106 (as illustrated in FIG. 1B). In other embodiments and/or usage scenarios, the ad URLs are wrapped, and URL request(s) 162 are sent to ad providers 106 via multi-provider ad selector 126. In response to URL request(s) 162, ad providers 106 return ad content(s) 172, such as respective displayable versions of the resultant ads. In further embodiments and/or usage scenarios, if the ad URLs are wrapped, the respective displayable versions of the resultant ads are returned via multi-provider ad selector 126, enabling multi-provider ad selector 126 to optionally and/or selectively wrap embedded URLs in the respective displayable versions of the resultant ads. In some embodiments, accounting for delivery of the resultant ads is in response to URL request(s) 162. In further embodiments, if the ad URLs are wrapped by multi-provider ad selector 126, then multi-provider ad selector 126 optionally and/or selectively accounts for the delivery of the resultant ads.

As illustrated in FIG. 1C, further ad accounting occurs in response to a user of the particular device clicking-through one of the resultant ads. In some embodiments, clicking-through one of the resultant ads communicates (such as via click-through(s) 186) directly to ad providers 106. In other embodiments, such as where embedded URLs in the resultant ads are wrapped by multi-provider ad selector 126, clicking-through one of the resultant ads communicates to ad providers 106 (forwarded click-through(s) 176) via multi-provider ad selector 126 (click-through(s) 166), and multi-provider ad selector 126 is enabled to account for the clicking-through.

As illustrated in FIG. 1C, in some embodiments, (respective operators of) ad providers 106 share revenue (ad revenue 196) with (an operator of) multi-provider ad selector 126. In further embodiments, (an operator of) multi-provider ad selector 126 shares revenue (revenue share 198) with (respective operators of) external content server(s)/source(s) 138. Ad revenue 196 is determined according to business agreements between (the respective operators of) ad providers 106 and (the operator of) multi-provider ad selector 126, as well as from ad accounting and/or ad statistics information, such as ad fill rate or click-through rate. In some embodiments, (the operator of) multi-provider ad selector 126 is enabled to verify ad accounting information provided by ad providers 106 (or to supply ad accounting information to ad providers 106) by maintaining an independent accounting, such as by wrapping URLs to account for delivered ads and/or clicked-through ads. In various embodiments, (the operator of) multi-provider ad selector 126 is enabled to share a portion (revenue share 198) of ad revenue 196 with (the respective operator of) a particular one of external content server(s)/source(s) 138 using ad accounting information and/or ad statistics information related to serving content of the particular one of external content server(s)/source(s) 138.

Of course, FIG. 1C illustrates one example of revenue sharing, and many other revenue sharing models are within the scope of the teachings herein. For example, via content provider tags, (the respective operators of) ad providers 106 share revenue with one or more of (the respective operators of) external content server(s)/source(s) 138, and the one or more of (the respective operators of) external content server(s)/source(s) 138 share a portion of the revenue with (the operator of) content server 128 and/or multi-provider ad selector 126.

In various embodiments, content server 128 is not used, or is not used for all content of external content server(s)/source(s) 138. External content server(s)/source(s) 138 generate at least some ad requests directly for multi-provider ad selector 126, and optionally and/or selectively provide revenue to or receive revenue from multi-provider ad selector 126 according to the at least some ad requests (and according to other factors, such as ad statistics associated with the at least some ad requests). For example, in some embodiments and/or usage scenarios, content server 128 hosts mobile video content of at least some of external content server(s)/source(s) 138 and other content of external content server(s)/source(s) 138 is hosted elsewhere. Continuing the example, multi-provider ad selector 126 is given ad requests by content server 128 in association with the mobile video content, and multi-provider ad selector 126 is given ad requests by external content server(s)/source(s) 138 in association with the other content.

In some embodiments, multi-provider ad selector 126 receives ad requests from one or more sources (such as from content server 128 or from one or more of external content server(s)/source(s) 138). Each of the ad requests is in a respective message, and the respective message has an associated source (such as a source identified by a source network address of the respective message). For a particular one of the ad requests, multi-provider ad selector 126 is configured to share revenue obtained according to the particular ad request (such as from delivery and/or display of ad content resulting from the ad request, or from click-through on the ad content) with the associated source of the ad request.

Figure 2:
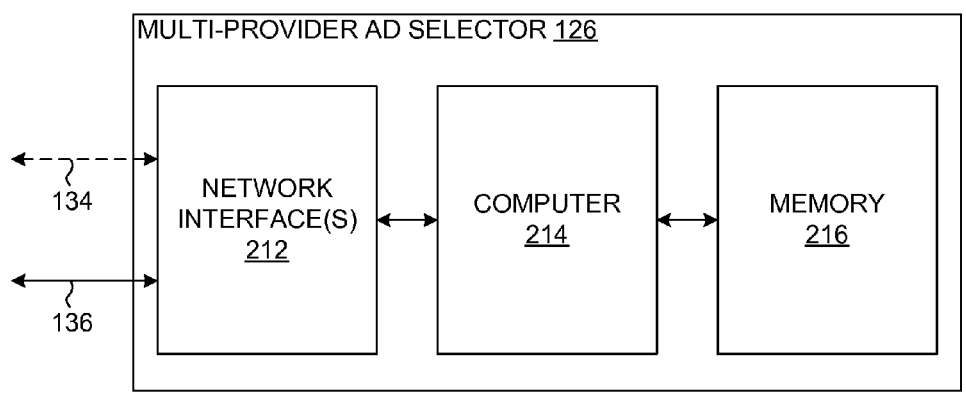
FIG. 2 illustrates selected details of an embodiment of a multi-provider ad selector.

FIG. 2 illustrates selected details of an embodiment of a multi-provider ad selector. As illustrated in FIG. 2, multi-provider ad selector 126 includes network interface(s) 212, computer 214, and memory 216. Of course, many embodiments of multi-provider ad selector 126 are envisioned, and FIG. 2 merely illustrates one example embodiment.

As illustrated in FIG. 2, network interface(s) 212 are coupled to computer 214, and computer 214 is coupled to memory 216. In various embodiments, network interface(s) 212 are also coupled to memory 216. Link 134 (as also illustrated in FIG. 1A) provides a first connection, such as to content server 128 via network 110 (as illustrated in FIG. 1A). Link 136 (as also illustrated in FIG. 1A) provides a second connection, such as to ad providers 106 via network 116 (as illustrated in FIG. 1A). Of course, as explained with regard to FIG. 1A, there are many embodiments of network 110 (and correspondingly of link 134), and of network 116 (and correspondingly of link 136), and any coupling (such as any electrical and/or optical coupling) to multi-provider ad selector 126 is within a scope of the teachings herein.

Memory 216 is used to store data and/or software used by computer 214. In some embodiments, memory 216 is used to store packets, messages, or other communications transmitted and/or received via network interface(s) 212. According to various embodiments, memory 216 includes one or more of: static random access memory (SRAM); dynamic random access memory (DRAM); non-volatile electronic storage, such as flash memory; non-volatile magnetic or optical storage, such as hard disks or CD/DVD drives; and any other computer storage medium.

Computer 214 is a computer and/or a computer system executing software, such as programs stored in memory 216, to perform functions of multi-provider ad selector 126. In various embodiments, computer 214 includes memory 216 and/or network interface(s) 212. In some embodiments, the functions of multi-provider ad selector 126 are implemented by one or more programs executing on computer 214. According to various embodiments, the one or more programs are and/or include one or more of: operating systems; system calls to an operating system; interrupt routines; device drivers; one or more threads or other lightweight processes; shared memory communication; inter-process communication; remote procedure call; messaging; TCP/IP communications; communications via pipes, sockets, or ports; file input/output; access to peripherals, such as hard disks; compiled programs, such as programs written in the C language; scripted and/or interpreted programs, such as programs written in the Java language; and any other programs, scripts, or techniques known in computer programming.

In some embodiments, content server 128 and/or server 124, as illustrated in FIG. 1A, are substantially similar to multi-provider ad selector 126 as illustrated in FIG. 2. For example, in various embodiments, content server 128 and/or server 124 include one or more of: network interface(s) similar to network interface(s) 212; a memory similar to memory 216; and a computer and/or a computer system similar to computer 214, and enabled to execute software stored in the memory to perform functions of content server 128 and/or server 124. Content server 128 and/or server 124 are optionally different from multi-provider ad selector 126 as illustrated in FIG. 2 by number and type of network interfaces and/or images of software as retained in memory 216.

Figure 3A:
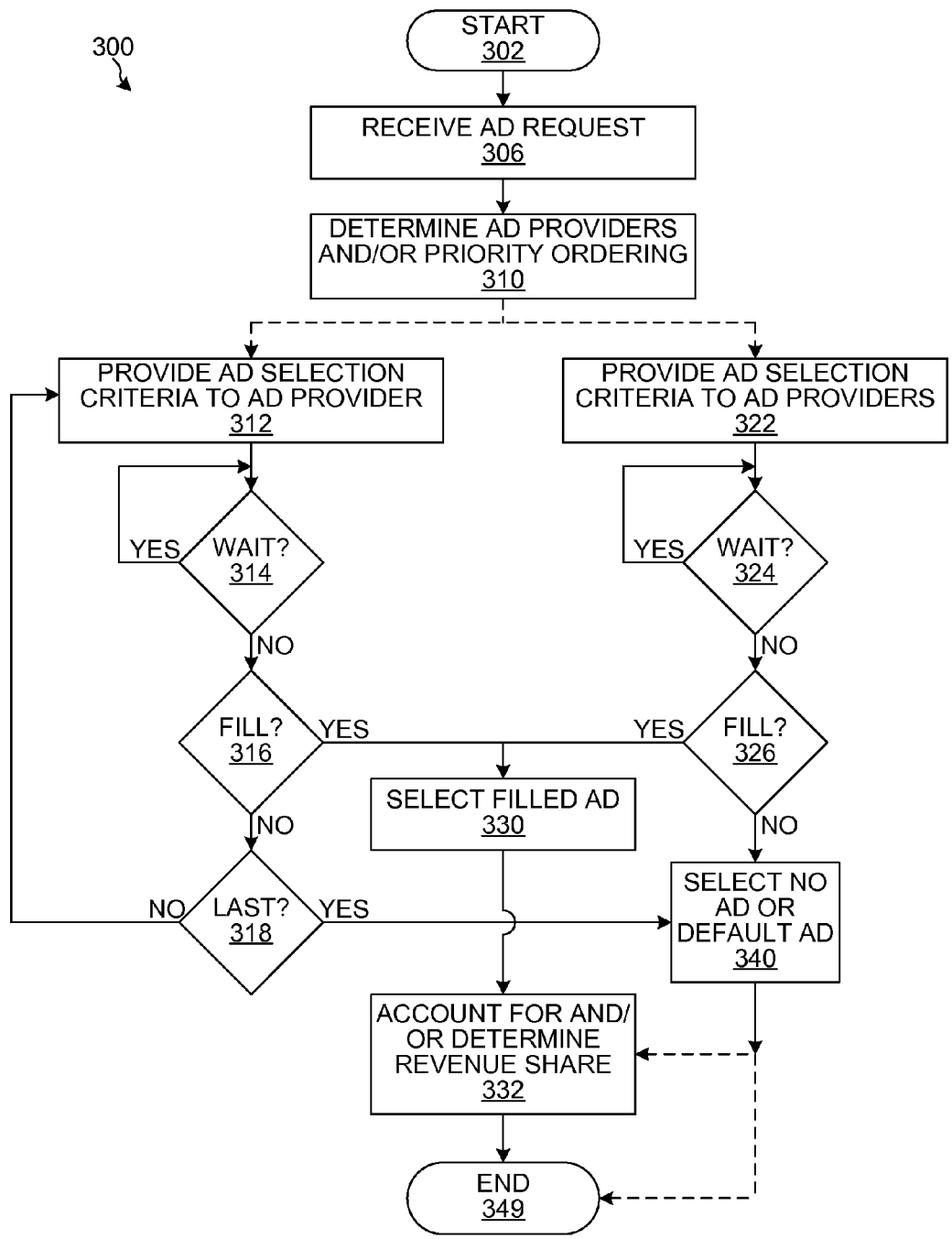
FIG. 3A illustrates selected details of an embodiment of a process for filling ads by selectively using a plurality of ad providers.

FIG. 3A illustrates selected details of an embodiment of a process for filling ads by selectively using a plurality of ad providers. In some embodiments, process 300 is performed on a multi-provider ad selector, such as multi-provider ad selector 126 as illustrated in FIG. 1A. In other embodiments, process 300 is performed on a server that includes a content server and a multi-provider ad selector, such as server 124 as illustrated in FIG. 1A. In some embodiments, all or any portion of actions illustrated by or described in conjunction with FIG. 3A are performed by one or more computers (such as included in multi-provider ad selector 126 of FIG. 1A) via execution of instructions stored on a computer-readable medium (such as all or any portion of memory 216 of FIG. 2).

Process 300 starts ("START" 302) and receives an ad request (for example, from content server 128 as illustrated in FIG. 1A) containing ad selection criteria and/or other ad information, such as ad provider selection criteria ("RECEIVE AD REQUEST" 306). Using the other ad information, process 300 determines one or more of: a selection of one or more ad providers from among a plurality of ad providers; a maximum number of the ad providers to be used; and a priority ordering of the selected ad providers ("DETERMINE AD PROVIDERS AND/OR PRIORITY ORDER- ING" 310). In some embodiments, the multi-provider ad selector is used as a lowest-priority one of the selected ad providers.

Next, process 300 proceeds down one of two paths, depending on whether the ad selection criteria are provided to the selected ad providers in serial (a "serial" path) or wholly or partially in parallel (a "parallel" path). Of course, in other embodiments, combinations of serial and parallel are possible. For example, all of the selected ad providers except for the multi-provider ad selector (acting as a lowest-priority one of the selected ad providers) are provided the ad selection criteria wholly or partially in parallel, and the multi-provider ad selector is only used if none of the other selected ad providers is able to fill an ad according to the ad selection criteria.

On the "serial" path (illustrated in part on the left in FIG. 3A), process 300 provides the ad selection criteria to a current one of the selected ad providers ("PROVIDE AD SELECTION CRITERIA TO AD PROVIDER" 312), with the current ad provider initially being a first one of the selected ad providers, such as a highest-priority (in the priority ordering) one of the selected ad providers. Next, process 300 waits for a response from the current ad provider, and optionally, in some embodiments, waits for a timeout period to expire ("WAIT?" 314). If there was a response and the ad was filled according to the ad selection criteria ("FILL?" 316), a resultant ad is set to be the filled ad ("SELECT FILLED AD" 330). If there was no response (a timeout occurred) or the response indicated that no ad was filled according to the ad selection criteria, then a test is made ("LAST?" 318) to determine if there is a next one of the selected ad providers. If there is a next ad provider, then process 300 sets the current ad provider to the next ad provider, and returns to provide the ad selection criteria to the (new) current ad provider ("PROVIDE AD SELECTION CRITERIA TO AD PROVIDER" 312). In some embodiments, process 300 provides the ad selection criteria to the selected ad providers in the priority ordering. If there is no next ad provider (the current ad provider is a last one of the selected ad providers), then process 300 returns no ad, or optionally and/or selectively chooses a default ad as the resultant ad ("SELECT NO AD OR DEFAULT AD" 340).

On the "parallel" path (illustrated in part on the right in FIG. 3A), process 300 provides the ad selection criteria wholly or partially in parallel to all of the selected ad providers ("PROVIDE AD SELECTION CRITERIA TO AD PROVIDERS" 322). Next, process 300 waits for a response from the selected ad providers ("WAIT?" 324). According to various embodiments, waiting for a response includes waiting for one or more of: a response including a filled ad from at least one of the selected ad providers; a response including at least one filled ad from a highest-priority subset of the selected ad providers; a response from all of the selected ad providers; and a timeout period to expire. If there was a response and the ad was filled according to the ad selection criteria ("FILL?" 326), a resultant ad is set to be the filled ad ("SELECT FILLED AD" 330). If there was no response (a timeout occurred) or the response indicated that no ad was filled according to the ad selection criteria, then process 300 returns no ad, or optionally and/or selectively chooses a default ad as the resultant ad ("SELECT NO AD OR DEFAULT AD" 340).

When an ad was filled and a resultant ad was selected ("SELECT FILLED AD" 330), process 300 accounts for revenue due to the ad selection ("ACCOUNT FOR AND/OR DETERMINE REVENUE SHARE" 332). For example, the accounting tracks, for each of the ad providers, a number of ads that have been filled by the ad provider, and a number of times the ad provider has been provided ad selection criteria (the ratio of which, in some embodiments, provides a serve-through rate for each of the ad providers). Process 300 then ends ("END" 349).

When no ad was filled and optionally and/or selectively a default ad is selected as the resultant ad ("SELECT NO AD OR DEFAULT AD" 340), process 300 optionally accounts for revenue due to the ad selection ("ACCOUNT FOR AND/OR DETERMINE REVENUE SHARE" 332). In some embodiments and/or usage scenarios, the default ad originated from a particular one of the ad providers, and revenue is obtained from the particular ad provider for the selection and/or the delivery of the default ad. Process 300 then ends ("END" 349).

Figure 3B:
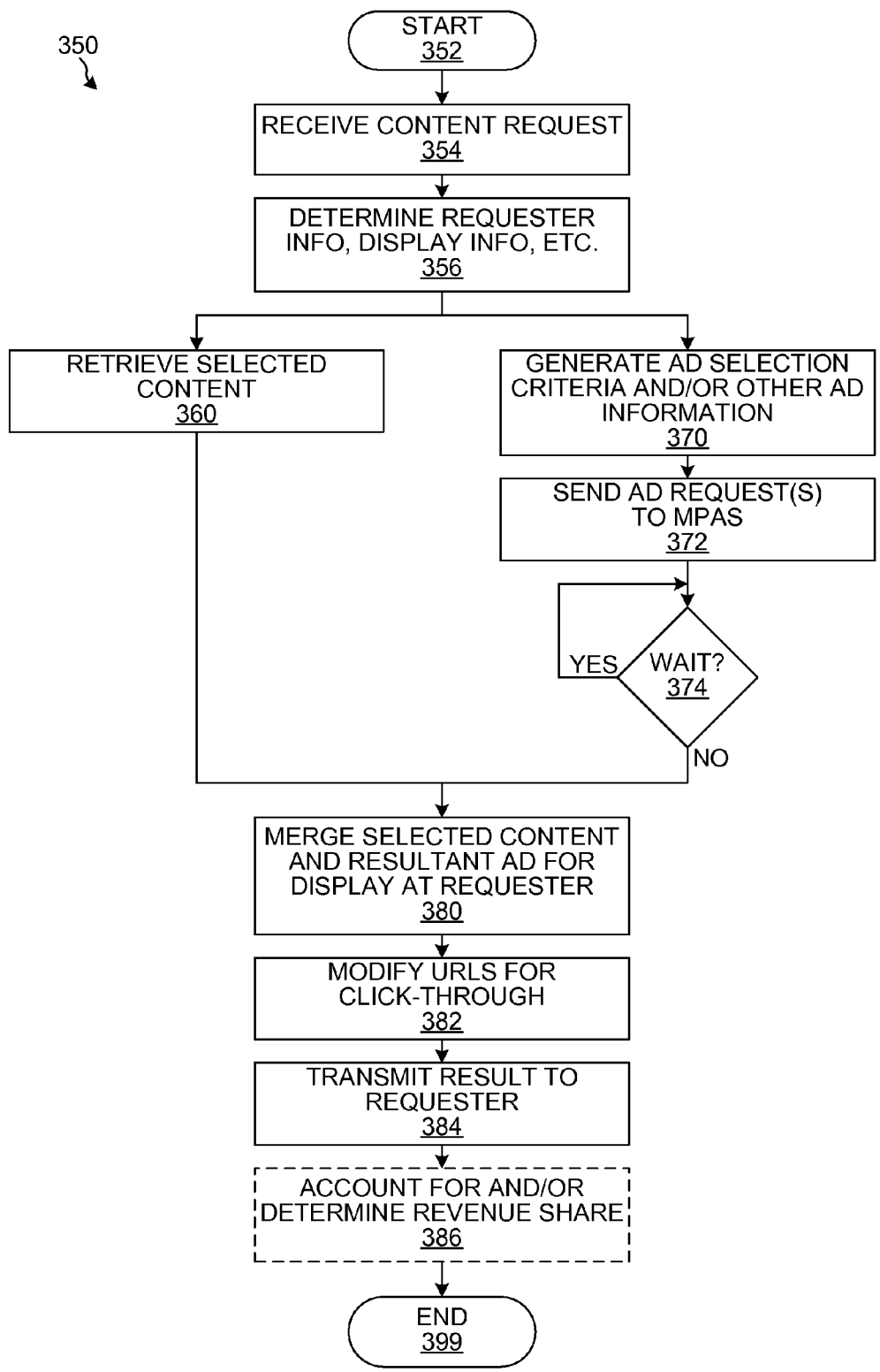
FIG. 3B illustrates selected details of an embodiment of a process for managing content requests, including filling associated ads for requested content using a multi-provider ad selector.

FIG. 3B illustrates selected details of an embodiment of a process for managing content requests, including filling associated ads for the requested content using a multi-provider ad selector. In some embodiments, process 350 is performed on a content server, such as content server 128 as illustrated in FIG. 1A. In other embodiments, process 350 is performed on a server that includes a content server and a multi-provider ad selector, such as server 124 as illustrated in FIG. 1A. In some embodiments, all or any portion of actions illustrated by or described in conjunction with FIG. 3B are performed by one or more computers (such as included in content server 128 or server 124 of FIG. 1A) via execution of instructions stored on a computer-readable medium (such as all or any portion of a memory similar in function to memory 216 of FIG. 2).

Process 350 starts ("START" 352) and receives a content request, such as from a user via a cellular telephone ("RECEIVE CONTENT REQUEST" 354). Various information is determined from the content request itself, or is obtained via the content request ("DETERMINE REQUESTER INFO, DISPLAY INFO, ETC." 356). In a first example, a model of a cellular telephone and/or a cellular telephone network provider used to transmit the content request are determined. Continuing the first example, information regarding the model of the cellular telephone and/or the cellular telephone network provider indicates a screen size and/or other restrictions (such as software of the cellular telephone and/or network restrictions of the cellular telephone network provider) that limit and/or control an ability of the cellular telephone to receive video content. That is, the model of the cellular telephone and/or the cellular telephone network provider are used to determine a video format and/or video resolution usable to send video content to the cellular telephone. In a second example, a cellular telephone network provider used to transmit the content request is determined, and from the cellular telephone network provider, using other information in the content request (such as an originating network address), demographic and/or geographic information of the user is determined. In some embodiments, the demographic information includes an age of a registered user of the cellular telephone. In a third example, information associated with a formatted display, such as a web page or a WAP page, is determined. The information includes a number of ads, and/or a location/time of each of one or more places and/or times in the formatted display in which a selected ad will be inserted. In some embodiments, the information associated with the formatted display further includes a type or a preferred type of ad associated with each of the locations/times.

Next, process 350 proceeds down two paths, one to retrieve content selected by the content request ("RETRIEVE SELECTED CONTENT" 360), and one to determine one or more ads to go with the selected content. In some embodiments, each of the one or more ads has a respective location/time in the formatted display.

In some embodiments, the selected content is retrieved ("RETRIEVE SELECTED CONTENT" 360) according to the content request and/or to the various information determined from and/or obtained via the content request. For example, in some embodiments, the content retrieval is based, at least in part, on a model of a cellular telephone and/or a cellular telephone network provider used to transmit the content request. In some embodiments, the selected content is retrieved, at least in part, prior to or as part of determining the information from or obtaining the information via the content request ("DETERMINE REQUESTER INFO, DISPLAY INFO, ETC." 356), and the various information includes information retrieved with the selected content.

To determine the one or more ads, for each of the one or more ads, respective ad selection criteria and/or respective other ad information, such as respective ad provider selection criteria, are generated ("GENERATE AD SELECTION CRITERIA AND/OR OTHER AD INFORMATION" 370). In some embodiments, the respective ad selection criteria and/or respective other ad information vary according to the respective location/time of the ad, and/or according to a type or a preferred type of the ad. Then, for each of the one or more ads, an ad request including the respective ad selection criteria and/or the respective other ad information is sent to a multi-provide ad selector ("SEND AD REQUEST(S) TO MPAS" 372), and a respective response is awaited ("WAIT?" 374).

When a response has been received for each of the ad requests, processing continues with merging the selected content and the one or more ads into the formatted display ("MERGE SELECTED CONTENT AND RESULTANT AD FOR DISPLAY AT REQUESTER" 380). For example, in some embodiments, the merging includes modifying HTML and/or WML describing the formatted display to include (and/or to include references to) the selected content and/or the one or more ads. As part of or subsequent to the merging, network locators, such as URLs, that are part of and/or are references to the one or more ads are modified for click-through processing ("MODIFY URLS FOR CLICK-THROUGH" 382). The merged and modified formatted display, including the selected content and the one or more ads, is then transmitted, in response to the content request ("TRANSMIT RESULT TO REQUESTER" 384), such as back to the user who originated the content request on the cellular telephone that sourced the content request. Optionally, accounting is done for the one or more ads, such as for delivery of the one or more ads ("ACCOUNT FOR AND/OR DETERMINE REVENUE SHARE" 386).

In some embodiments (not illustrated in FIG. 3B), additional accounting is performed for click-through on any of the one or more ads. (Click-through accounting occurs subsequent to the user clicking on one of the one-more ads.)

Process 350 then ends ("END" 399).

Figure 4A:
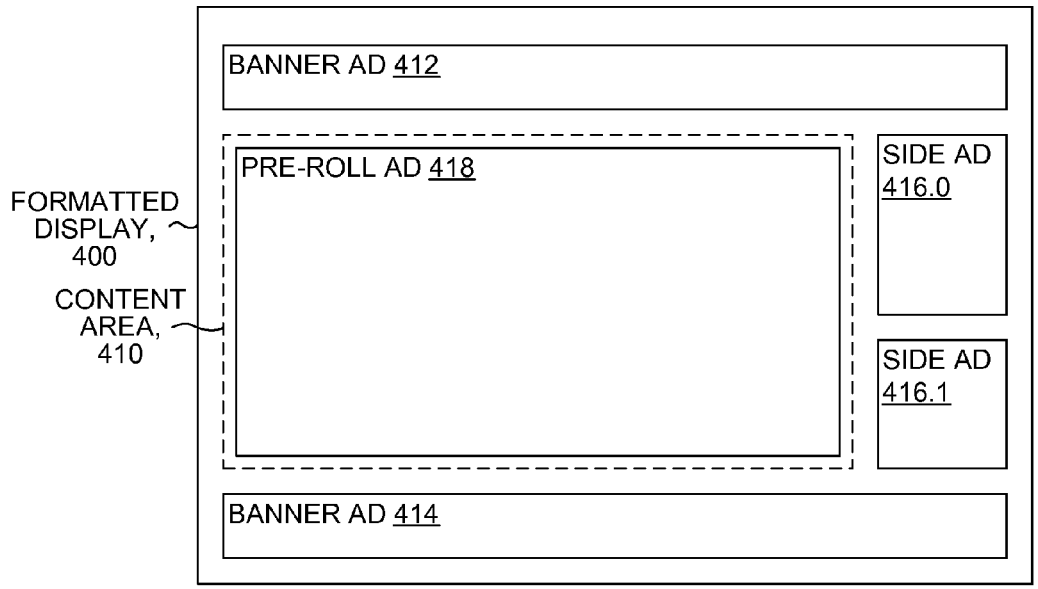
FIGS. 4A and 4B illustrate examples of a formatted display.
Figure 4B:
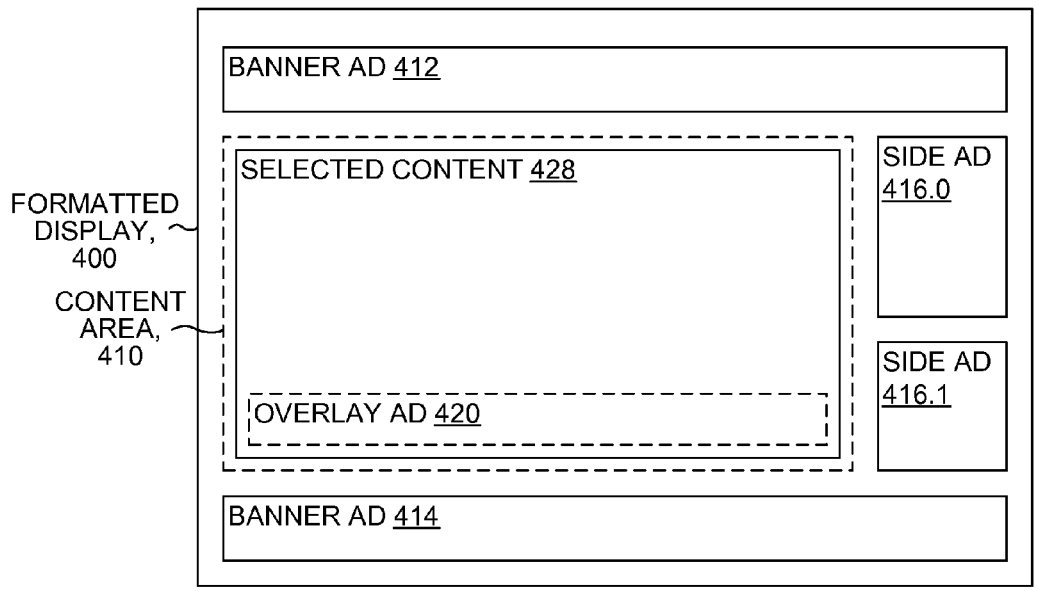

FIGS. 4A and 4B illustrate examples of a formatted display. FIG. 4A illustrates formatted display 400 in an initial state (such as formatted display 400 would initially appear on a device, for example on a cellular telephone), and FIG. 4B illustrates formatted display 400 at a subsequent time (such as formatted display 400 would appear on the device after starting display of a selected portion of content returned in response to a content request of a user of the device).

As illustrated in FIGS. 4A and 4B, formatted display 400 has locations/times for multiple ads to be displayed. Both FIGS. 4A and 4B illustrate a top banner ad (banner ad 412), a bottom banner ad (banner ad 414), two side ads (416.0 and 416.1), and an area for content to be displayed (content area 410).

As illustrated in FIG. 4A, content area 410 is initially used to display pre-roll ad 418. For example, pre-roll ad 418 is a video ad that is played prior to playing and/or displaying the selected portion of the content. Any of the other ads (banner ad 412, banner ad 414, and side ads 416.0 and 416.1) are optionally and/or selectively any other type of ad, such as a still ad, an animated ad, or a video ad.

As illustrated in FIG. 4B, content area 410 is subsequently used to display the selected portion of the content (selected content 428). Further, content area 410 also displays overlay ad 420. Overlay ad 420 is displayed on top of selected content 428 and obscures a portion of selected content 428. According to various embodiments, overlay ad 420 is one or more of: at least partly transparent; and displayed for only a portion of selected content 428, such as for an initial time duration.

Before, during, and/or subsequent to playing selected content 428, any of the ads (banner ad 412, banner ad 414, side ad 416.0, side ad 416.1, and overlay ad 420) optionally and/or selectively are changed from a first respective ad to a second respective ad. In a first example, when starting to play selected content 428, side ad 416.0 and/or side ad 416.1 are changed from an initial respective ad to a subsequent respective ad. In a second example, subsequent to playing selected content 428, content area 410 is used to display a post-roll ad.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (i.e., the callouts or numerical designators) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as a nature, type, capacity, or performance of computers or memories; a bandwidth, type, or protocol of any network, network interface, communications link, connection, or coupling; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communications links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design include insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
   determining information in response to a content request originated by a user via a device;
   computing advertising selection criteria to create computed advertising selection criteria based at least in part on all or any portion of the information;
   choosing at least two of a plurality of advertising providers corresponding to respective plurality of advertising networks based at least in part on at least a first portion of the information;
   determining an ordering of the at least two of the plurality of advertising providers corresponding to the respective plurality of advertising networks based at least in part on at least a second portion of the information;
   providing a respective portion of the computed advertising selection criteria to the chosen plurality of advertising providers corresponding to the respective plurality of advertising networks; after the computed advertising selection criteria is created, each of the chosen plurality of advertising providers and corresponding plurality of advertising networks being configured to interactively attempt to select and provide respective advertising based at least in part on and in response to the computed advertising selection criteria received;
   selecting advertising, based at least in part on the ordering, from the respective advertising provided by one or more of the chosen plurality of advertising providers of respective plurality of advertising networks that have been interactively provided thereby in response to and after receipt of the computed advertising selection criteria;
   providing content in accordance with the content request and further in accordance with the selected advertising;
   wherein the device is enabled to communicate the content request to an agent at least in part via a network, and the agent is enabled to perform the determining information, the computing of advertising selection criteria, the choosing advertising providers of respective advertising networks, the determining an ordering, the providing a respective portion of the computed advertising selection criteria, and the selecting advertising; and
   wherein the providing content is compatible with display of the content on the device.

2. The method of claim 1, wherein the information comprises information determined from a network locator of the content request.

3. The method of claim 1, wherein the information comprises information associated with an account of the user.

4. The method of claim 1, wherein the information comprises demographic information associated with the user.

5. The method of claim 1, wherein the information comprises geographic information of the user.

6. The method of claim 5, wherein the geographic information comprises a location of the device.

7. The method of claim 1, wherein the information comprises history information associated with the user.

8. The method of claim 7, wherein the history information comprises browser history.

9. The method of claim 1, wherein the providing content is compatible with viewing the content by the user via a cellular telephone.

10. The method of claim 9, wherein the providing content comprises providing video content.

11. The method of claim 1, wherein the ordering is based at least in part on revenue obtainable from one or more of the advertising providers.

12. The method of claim 11, wherein greater revenue is obtainable from a first one of the advertising providers as compared to a second one of the advertising providers, and the ordering gives preference to the first advertising provider as compared to the second advertising provider.

13. The method of claim 1, wherein the agent comprises a first agent and a second agent, the first agent enabled to perform the determining information, and the second agent enabled to perform the selecting advertising.

14. The method of claim 13, further comprising communicating the selected advertising from the second agent to the first agent.

15. The method of claim 13, wherein the second agent comprises one of the at least two advertising providers.

16. The method of claim 1, wherein, for at least one of the at least some of the chosen advertising providers, the respective portion of the computed advertising selection criteria comprises a respective tag, the respective tag specifying an operator of a content source associated with the content.

17. The method of claim 1, wherein the providing a respective portion of the computed advertising selection criteria comprises providing the respective portion of the computed advertising selection criteria to a first one of the at least some of the chosen advertising providers, and
waiting for a response from the first chosen advertising provider prior to providing the respective portion of the computed advertising selection criteria to a second one of the at least some of the chosen advertising providers.

18. The method of claim 17, wherein the waiting for a response comprises waiting for either a reply from the first chosen advertising provider or a timeout.

19. A non-transitory computer-readable medium having a set of instructions stored therein which when executed by a computer causes the computer to perform procedures comprising:
   determining information in response to a content request originated by a user via a device;
   computed advertising selection criteria based at least in part on all or any portion of the information;
   choosing at least two of a plurality of advertising providers corresponding to respective advertising networks based at least in part on at least a first portion of the information;
   determining an ordering of the at least two advertising providers corresponding to the respective advertising networks based at least in part on at least a second portion of the information;
   providing a respective portion of the computed advertising selection criteria to each of at least some of the chosen advertising providers corresponding to the respective advertising networks, after the computed advertising selection criteria is created, each of the chosen advertising providers and corresponding advertising networks being configured to interactively attempt to select and provide respective advertising based at least in part on and in response to at least some of the respective portion of the computed advertising selection criteria received;
   selecting advertising, based at least in part on the ordering, from the respective advertising provided by one or more of the chosen advertising providers of respective advertising networks that have been interactively provided thereby in response to and after receipt of the computed advertising selection criteria;
   providing content in accordance with the content request and further in accordance with the selected advertising;
   wherein the device is enabled to communicate the content request to the computer at least in part via a network; and
   wherein the providing content is compatible with display of the content on the device.

20. The non-transitory computer-readable medium of claim 19, wherein the information comprises information determined from a network locator of the content request.

21. The non-transitory computer-readable medium of claim 19, wherein the providing content is compatible with viewing the content by the user via a cellular telephone.

22. The non-transitory computer-readable medium of claim 19, wherein the ordering is based at least in part on revenue obtainable from one or more of the advertising providers.

23. The non-transitory computer-readable medium of claim 19, wherein the computer comprises a first computer and a second computer, the first computer enabled to perform the determining information, and the second computer enabled to perform the selecting advertising.

24. The non-transitory computer-readable medium of claim 23, further comprising communicating the selected advertising from the second computer to the first computer.

25. The non-transitory computer-readable medium of claim 23, wherein the second computer comprises one of the at least two advertising providers.

* * * * *